United States Patent
Day et al.

(10) Patent No.: US 6,588,297 B1
(45) Date of Patent: Jul. 8, 2003

(54) INTEGRATED RIDER CONTROL SYSTEM FOR HANDLEBAR STEERED VEHICLES

(75) Inventors: Frederick K. W. Day, Chicago, IL (US); Todd J. Darland, Chicago, IL (US); Charles M. Goldman, Chicago, IL (US); Christine Raymo, Chicago, IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/526,659

(22) Filed: Mar. 15, 2000

(51) Int. Cl.[7] .............................................. B62K 21/12
(52) U.S. Cl. ...................... 74/551.8; D12/114; 340/432
(58) Field of Search ............................ 74/551.1–551.8, 74/552–558; 340/432, 438, 691.1, 693.5; 180/219; D12/110, 111, 114, 192

(56) References Cited

U.S. PATENT DOCUMENTS

| | | | | |
|---|---|---|---|---|
| 1,994,837 A | * | 3/1935 | Onge | 74/551.8 |
| 2,004,089 A | * | 6/1935 | Anderson | 74/551.8 |
| 2,034,934 A | * | 3/1936 | Anderson | 74/551.8 |
| 2,168,939 A | * | 8/1939 | Kraeft | 74/551.8 |
| 2,169,256 A | * | 8/1939 | Kraeft | 74/551.8 |
| 2,588,671 A | * | 3/1952 | Tringali | 74/551.8 |
| 3,834,249 A | | 9/1974 | Bothwell | 74/551.8 |
| D247,292 S | | 2/1978 | Brown | D12/189 |
| 4,337,503 A | * | 6/1982 | Turner | 74/551.8 |

(List continued on next page.)

FOREIGN PATENT DOCUMENTS

| | | | | |
|---|---|---|---|---|
| DE | 1092332 | * | 11/1960 | 74/551.8 |
| FR | 2654698 | | 11/1989 | |
| FR | 2678231 | | 6/1991 | |
| FR | 2775248 | | 2/1999 | |
| GB | 301636 | | 12/1928 | |
| GB | 493023 | * | 9/1938 | 74/551.8 |
| GB | 605614 | | 7/1948 | |
| GB | 2138755 | | 10/1984 | |
| GB | 2293800 | | 4/1996 | |
| IT | 441673 | * | 11/1948 | 74/551.8 |

OTHER PUBLICATIONS

One set of 10 pages of photographs of an Itera bicycle and/or handlebar.
One set of 3 pages of photographs of a Huffy bicycle and/or handlebar.

*Primary Examiner*—Chong H. Kim
(74) *Attorney, Agent, or Firm*—Milan Milosevic; Lisa Wunderlich

(57) ABSTRACT

An integral rider control device coupled to a handlebar steered vehicle includes an elongate integral support structure having receptacles and non-cylindrical mounting surfaces, and a central region of the structure configured to pivotally couple to the vehicle. Each receptacle is configured to integrally receive at least one accessory, control or display. The mounting surfaces are configured for the integral attachment of the accessories, controls and displays. The device can include upper and lower elongate spars. An integrated rider control system includes an elongate stem, the structure pivotally coupled to the stem, and two mandrels outwardly projecting from left and right ends of the structure. A cushionable cover connected to the structure. A rider control device includes an elongate member having at least two gripping surfaces and an elongate open recess defined into the member and configured to receive one of integrally attached accessories, controls and displays. A control pod adapted to contain controls for a bicycle handlebar. The control pod includes an actuator, a housing attached to the actuator, and at least two receptacles defined within the housing. A control assembly for a bicycle handlebar assembly includes a stop, a control device configured to contain at least two controls and a handgrip. The structure includes an end having a plurality of outwardly projecting detents for discrete positional movement of a mandrel attachment. The control pod slidably mounted to the handlebar. A remote garage door opener connected to a bicycle handlebar assembly.

12 Claims, 40 Drawing Sheets

U.S. PATENT DOCUMENTS

| | | | | |
|---|---|---|---|---|
| 4,687,072 A | * | 8/1987 | Komuro | 180/219 |
| D301,027 S | | 5/1989 | Borromeo | D12/178 |
| 5,259,266 A | | 11/1993 | Morrone | 74/551.3 |
| 5,269,196 A | | 12/1993 | Rafac | 74/551.1 |
| 5,273,302 A | | 12/1993 | Ureel | 280/279 |
| 5,323,664 A | | 6/1994 | Fairfield et al. | 74/551.3 |
| 5,487,497 A | | 1/1996 | Kwiatkowski | 224/41 |
| 5,503,419 A | * | 4/1996 | Gardner | 74/551.1 |
| 5,503,773 A | * | 4/1996 | Pearce et al. | 74/551.1 |
| 5,509,328 A | * | 4/1996 | Lai | 74/551.3 |
| D372,893 S | * | 8/1996 | Harris | D12/178 |
| D373,339 S | | 9/1996 | Chen | D12/178 |
| 5,551,315 A | * | 9/1996 | Pikoulas | 74/502.2 |
| 5,595,259 A | * | 1/1997 | Gilliland et al. | 74/551.9 |
| 5,621,382 A | * | 4/1997 | Yamamoto | 340/432 |
| 5,676,021 A | | 10/1997 | Campagnolo | 74/489 |
| 5,779,253 A | * | 7/1998 | Lee | 74/551.3 |
| 5,795,050 A | | 8/1998 | Carter | 362/72 |
| 5,910,540 A | * | 6/1999 | Takahashi | 525/92 B |
| 5,921,145 A | | 7/1999 | Muser | 74/551.2 |
| D419,123 S | * | 1/2000 | Okuda | D12/178 |
| 6,069,788 A | | 5/2000 | Masui | 361/683 |
| 6,192,773 B1 | * | 2/2001 | Liao | 74/551.3 |
| 6,227,327 B1 | * | 5/2001 | Nigrin et al. | 180/402 |
| 6,244,131 B1 | * | 6/2001 | Liao | 74/551.3 |
| 6,305,241 B1 | * | 10/2001 | Masui et al. | 74/551.8 |

* cited by examiner

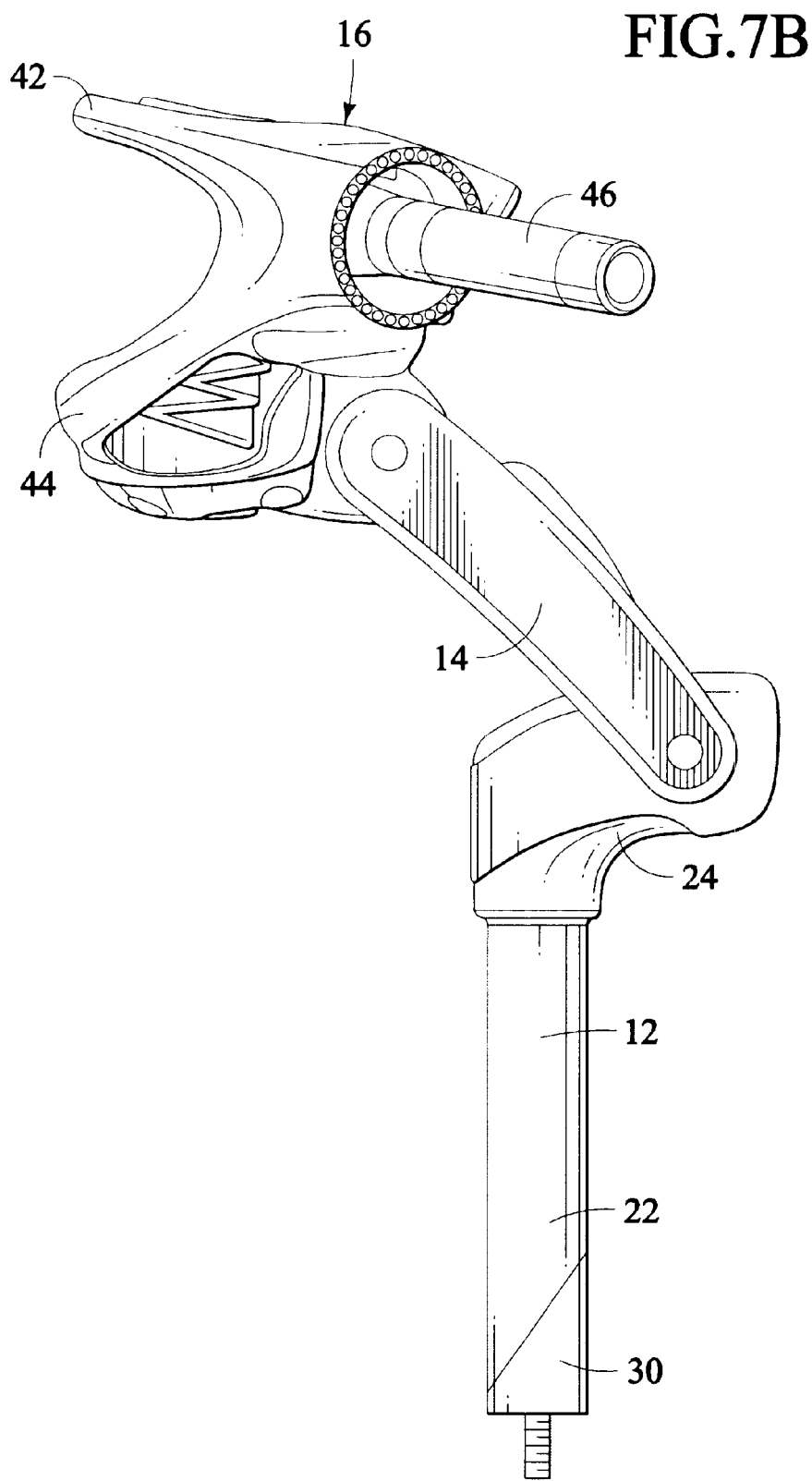

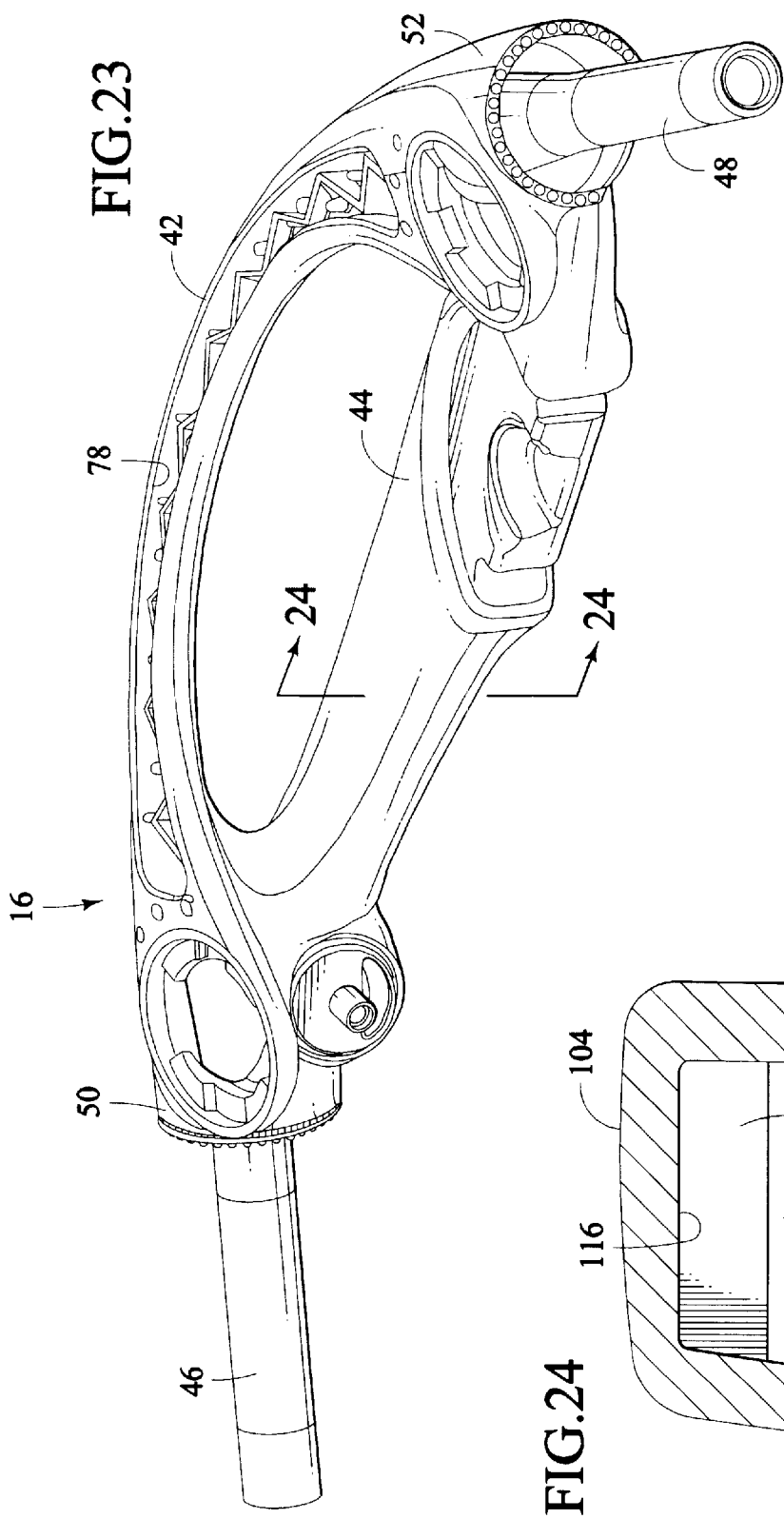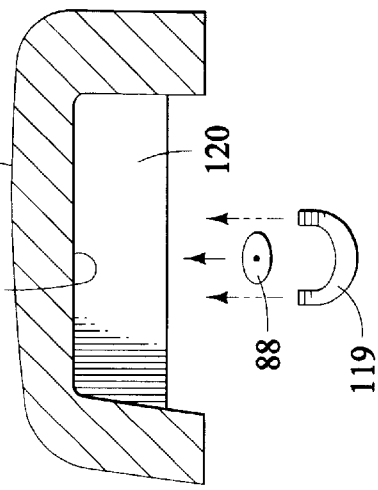

450

INTEGRATED RIDER CONTROL SYSTEM FOR HANDLEBAR STEERED VEHICLES

FIELD OF THE INVENTION

The present invention relates generally to the field of rider control systems for handlebar steered vehicles. More particularly, the invention relates to an integrated rider control system which integrates a handlebar with various controls, accessories and displays.

BACKGROUND OF THE INVENTION

Conventional handlebar assemblies typically include a tubular member transversely positioned with respect to the longitudinal axis of the bicycle, motorcycle, or other handlebar steered vehicle. These conventional tubular handlebars can be formed into one of a number of different shapes, such as a straight bar, a U-shape, and a ram horn shape. These handlebar assemblies commonly have additional equipment such as vehicle controls, accessories or displays. Controls typically include devices such as shifters, brakes, etc. Displays can include devices such as shifter displays, computer displays, etc. Accessories typically include devices such as bells, bags, horns, etc. Typically, this equipment is mounted on the tubular handlebar assemblies with clamps, bands, clips or other substantially exposed fasteners. Often the mounting of this equipment on the tubular handlebar is performed on a piece-meal basis.

A representative prior art structure of a handlebar assembly is shown in FIG. 1. The prior art handlebar assembly of FIG. 1 uses a cylindrical tubular metallic handlebar 10 having a plurality of accessories 11 clamped on to the handlebar assembly leaving a number of sharp metal surfaces and fasteners exposed. The equipment mounting on the prior art handlebar structure encroaches into the rider's space and reduces the locations available to the rider for gripping the handlebar assembly.

Existing handlebar assemblies for handlebar steered vehicles and handlebar mounted equipment, however, have a number of further drawbacks. First, existing handlebar assemblies provide limited surface area for the mounting of existing additional equipment. The limited availability of mounting space on existing handlebar assemblies contributes to improper, inefficient or ineffective mounting and location of the additional equipment. The improper mounting configurations of the additional equipment can obstruct the user's view, encroach into the riding space of the rider, and reduce the surface area and the number of locations available to the rider for gripping the handlebar assembly. Moreover, the tubular shape of existing handlebar assemblies severely limits the number and types of compatible fasteners for the mounting of the additional equipment to the handlebar assembly.

Second, existing handlebar mounted equipment is substantially externally mounted has exposed clamps, clips, cables and fasteners. These existing exposed accessories, controls, displays, clamps and fasteners often include sharp metallic surfaces all of which can, and often do, cause injury to a vehicle user who contacts these devices during operation of the vehicle. The prior art solution has been to employ a cover, such as a soft cap, over the exposed sharp metal surfaces or fasteners. The exposed cables and wires connecting the equipment are clumsy and susceptible to entanglement with and damage by foreign objects during operation of the vehicle. The externally mounted equipment can be easily removed or broken away by thieves or vandals. This susceptibility of existing equipment to theft severely limits the user's ability and freedom to easily store or leave the vehicle unattended. Further, the externally mounted equipment are often and easily dislodged from their desired positions by contact with the user or a foreign object leading to premature failure or contributing to repeated and excessive readjustment of the equipment.

Third, existing handlebar assemblies for handlebar steered vehicles can fail, leaving the user with severely limited ability to control the vehicle and increasing the probability of serious- injury to the rider or others. Existing single-bar handlebar assemblies will often fail in environments in which large stresses are placed on the handlebar, such as occur in mountain biking and other off-road applications.

Finally, existing handlebar assemblies are typically axially symmetrical and has a pair handgrips or a pair of control actuators on each side of the handlebar assembly that are difficult to align with respect to one another. The user often must make repeated "eye-ball" adjustments before obtaining the desired symmetrical and rotational positioning of the handgrips or the actuators.

Accordingly, it would be advantageous to provide a handlebar assembly for handlebar steered vehicles that provides for integrated attachment of various equipment. In particular, it would be advantageous to provide an integral rider control device that integrally and receivably accommodates equipment. What is needed is an integral rider control device that contains includes additional mounting surfaces and receiving ports for equipment. There is a continuing need for an integrated rider control system that ergonomically optimizes the location of hand gripping surfaces and the positioning of equipment such that the rider's view is not obstructed and encroachment into the rider's space is minimized. There is a need for a rider control system that is adaptable to a greater variety of fasteners and fastening techniques. It would be advantageous to provide a rider control system that eliminates sharp metallic surfaces projecting from equipment and their fasteners. There is a continuing need for an integrated rider control system that minimizes the amount of exposed cables extending between the equipment. What is needed is an integrated rider control system that integrates equipment into the control system thereby significantly reducing the susceptibility of the equipment to theft or dislocation by contact with the rider or foreign objects. There is a need for an integrated rider control system that allows for easy, accurate and efficient alignment of hand grips or actuators with respect to each other. There is a need to provide an integrated rider control system having a fail safe design configured to back up the primary load bearing rider control assembly. It would also be advantageous to provide an integrated rider control system with a greater hand grip adjustment range of motion than existing handlebar assemblies. Finally, it would be advantageous to provide an integrated rider control system that includes the features specified above and has an inherent aesthetically appealing appearance.

SUMMARY OF THE INVENTION

The present invention provides an integral rider control device for a handlebar steered vehicle. The integral rider control device includes an elongate integral support structure, a plurality of non-tubular mounting surfaces and a central region. The support having a left end for receiving a left a handgrip and a right end for receiving a right handgrip opposed to the left handgrip. The plurality of non-tubular mounting surfaces are formed in the integral support structure between the left end and the right end thereof. The mounting surfaces are each configured to receive a respective piece of equipment selected from the group consisting of controls, displays and accessories. The central region of the support structure configured to pivotally couple to the vehicle along a steering axis of the vehicle.

The present invention also provides for an integral handlebar for a handlebar-steered vehicle. The integral handlebar includes an integral elongate body having a left end adaptable to receive a left handgrip and a right end opposed to the left end and adaptable to receive a right handgrip. The body has a general surface. At least one receptacle is formed to extend inwardly from the general surface of the body and at a location between the left and right ends. The receptacle is adapted to receive a predetermined piece of equipment selected from the group consisting of controls, brakes and accessories. A depth of the receptacle is pre-selected such that the piece of equipment will be substantially flush-mounted with respect to the general surface of the body.

According to another aspect of the invention, the integral rider control device includes an integral support structure having upper and lower, substantially parallel elongate spars formed with the integral support structure. The lower spar is configured to pivotally couple to a steering axis of the vehicle.

The present invention also provides for a one-piece handlebar for use in steering a vehicle having a wheel turning on a steering axis. The handlebar includes a left end for receiving a left handgrip, a right end for receiving a right handgrip, and a center section disposed between the left and right ends. The center section has an elongated upper spar and an elongated lower spar. The upper spar is spaced substantially above the lower spar. The lower spar has at least one non-cylindrical equipment mounting surface. A steering coupler is formed on the lower spar for coupling the handlebar to the steering axis of the vehicle The present invention also provides for an integrated rider control system adapted to integrally support equipment for a bicycle. The integrated rider control system includes an elongate stem having a frame end and a stem head, an elongate integral support structure pivotally coupled to the head of the stem, and left and right mandrels outwardly projecting from left and right ends of the integral support structure. The stem is configured to removably connect to a steering axis of the bicycle. The integral support structure includes a plurality of non-cylindrical mounting surfaces. The mounting surfaces are configured for the integral attachment of the equipment.

The present invention also provides for a handle bar assembly for a bicycle. The handlebar assembly includes an elongate rider control device and a cushionable member. The rider control device has a left end, a right end and a middle portion disposed between and spaced from the left end and the right end of the rider control device. The cushionable member is matably received onto a non-cylindrical receiving surface formed in the middle portion.

The present invention also provides for a rider control device for a bicycle having a longitudinal axis. The rider control device includes an integral body, a first display receptacle formed in the body and an axis of the receptacle being angled in an inboard and rearward direction with respect to a vertical reference. The body has a left end for receiving a left hand grip and a right end opposed to the left end for receiving a right hand grip. The first display receptacle is formed in the body to be offset from the longitudinal axis. The first display receptacle is adapted to receive a display to be viewed by the rider. The axis of the receptacle is angled in an inboard and rearward direction with respect to a vertical reference.

The present invention also provides for a rider control device for a bicycle configured for integral attachment of at least one piece of equipment and at least one cable. The rider control device includes an elongate member having at least two gripping surfaces and inwardly extending side walls that form an elongate open recess disposed between left and right ends of the member. The recess is configured for receiving at least one piece of equipment. The member is configured to be pivotally coupled to the bicycle. The recess is configured to receive one of at least one of the attached pieces of equipment and the at least one cable.

The present invention also provides for a control pod adapted to contain a plurality of controls for a bicycle handlebar. The control pod includes one or more actuators selected from a group consisting of a brake lever, a gear shifter, and an integrated brake gear shifter, a housing attached to and covering a portion of the actuator, and at least two receptacles defined within the housing. The housing is configured to axially couple to an end of the bicycle handlebar and for rotational movement with respect to the end of the handlebar along an axis extending through the end of the handlebar. Each receptacle is configured to receive one of the control devices for the bicycle.

The present invention also provides for a control assembly for a bicycle handlebar assembly. The control assembly is configured to attach to a mandrel of the bicycle handlebar and to include at least two controls. The control device includes a positioning surface configured to extend in a plane substantially perpendicular to a longitudinal axis of the mandrel and to contact a stop coupled to the handlebar assembly when the control device is attached to the mandrel.

The present invention also provides for a rider control device for handlebar steered vehicles adapted to connect to a mandrel attachment. The rider control device includes an integral support structure configured to be coupled to a handlebar steered vehicle. The support structure has left and right mandrels outwardly projecting from left and right ends of the support structure, respectively. The support structure includes at least one substantially cylindrical sidewall outwardly projecting from at least of one of the left and right ends and extending along an axis substantially parallel to an axis of the mandrel. An edge of the cylindrical sidewall includes a plurality of outwardly projecting detents. The edge of the member is configured to engage, and allow for discrete rotational positional movement of the mandrel attachment, with respect to the mandrel.

According to another aspect of the invention, a control assembly having at least one stop and at least one mandrel for a bicycle handlebar. The control assembly includes a housing configured to slidably mount to the mandrel of the handlebar and to contact the stop of the handlebar. The housing includes a plurality of receptacles, a mandrel attachment coupled to the housing, and a fastener configured to couple to the end of the mandrel and retain the housing on the mandrel. Each receptacle of the housing is configured to receive a control.

According to another aspect of the invention, a rider control system for a bicycle includes a handlebar assembly, an upwardly projecting stem connected along a steering axis to the front portion of the bicycle, and a rider control device coupled to the stem and transversely positioned with respect to a longitudinal axis of the bicycle. The stem has a stem head connected to a distal end of the stem. An operating height adjustment range of the assembly extends from 0 to 245 millimeters above a base of the stem head. An operating reach adjustment range of left and right ends of the control device of the assembly extending from 0 to 185 millimeters fore of the steering axis and from 0 to 129 millimeters aft of the steering axis.

The present invention also provides for a bicycle safety system for a bicycle. The bicycle safety system includes a handlebar assembly connected to the bicycle and a garage door opener coupled to the assembly.

The present invention also provides for a one-piece molded handlebar for use in steering a vehicle having a wheel turning on a steering axis. The handlebar includes a left end for receiving a left handgrip, a right end for receiving a right handgrip, and a center section disposed between the left and right ends. The center section has an elongated upper spar and an elongated lower spar. The upper spar is spaced substantially above the lower spar. A steering coupler is formed on the lower spar for coupling the handlebar to the steering axis of the vehicle.

The present invention also provides for an integral rider control device for a bicycle. The control device includes an integral support structure having upper and lower, substantially parallel elongate spars. The lower spar is configured to pivotally couple to a steering axis of the vehicle. The lower spar has an upper surface. The upper and lower spars have an upper and lower spar centerlines, respectively. The upper spar centerline is positioned forward of the lower spar centerline. The upper spar has a rear margin that does not occlude a rider in a typical, semi-upright riding position from viewing the upper surface of the lower spar.

BRIEF DESCRIPTION OF THE DRAWINGS

The invention will become more fully understood from the following detailed description, taken in conjunction with the accompanying drawings, wherein like reference numerals refer to like parts, in which:

FIG. 7B is a side view of an integrated rider control system in accordance with an exemplary embodiment of the present invention with the stem in a rearwardly extending position;

FIG. 23 is a rear perspective view of an integral support structure in accordance with an exemplary embodiment of the present invention;

FIG. 24 is an exploded cross-sectional view of the lower spar of the integral support structure taken along line 24—24 of FIG. 23 illustrating cable attachment to the lower spar;

DETAILED DESCRIPTION OF THE PREFERRED EMBODIMENTS

I. Integrated Rider Control System

Figure 1:
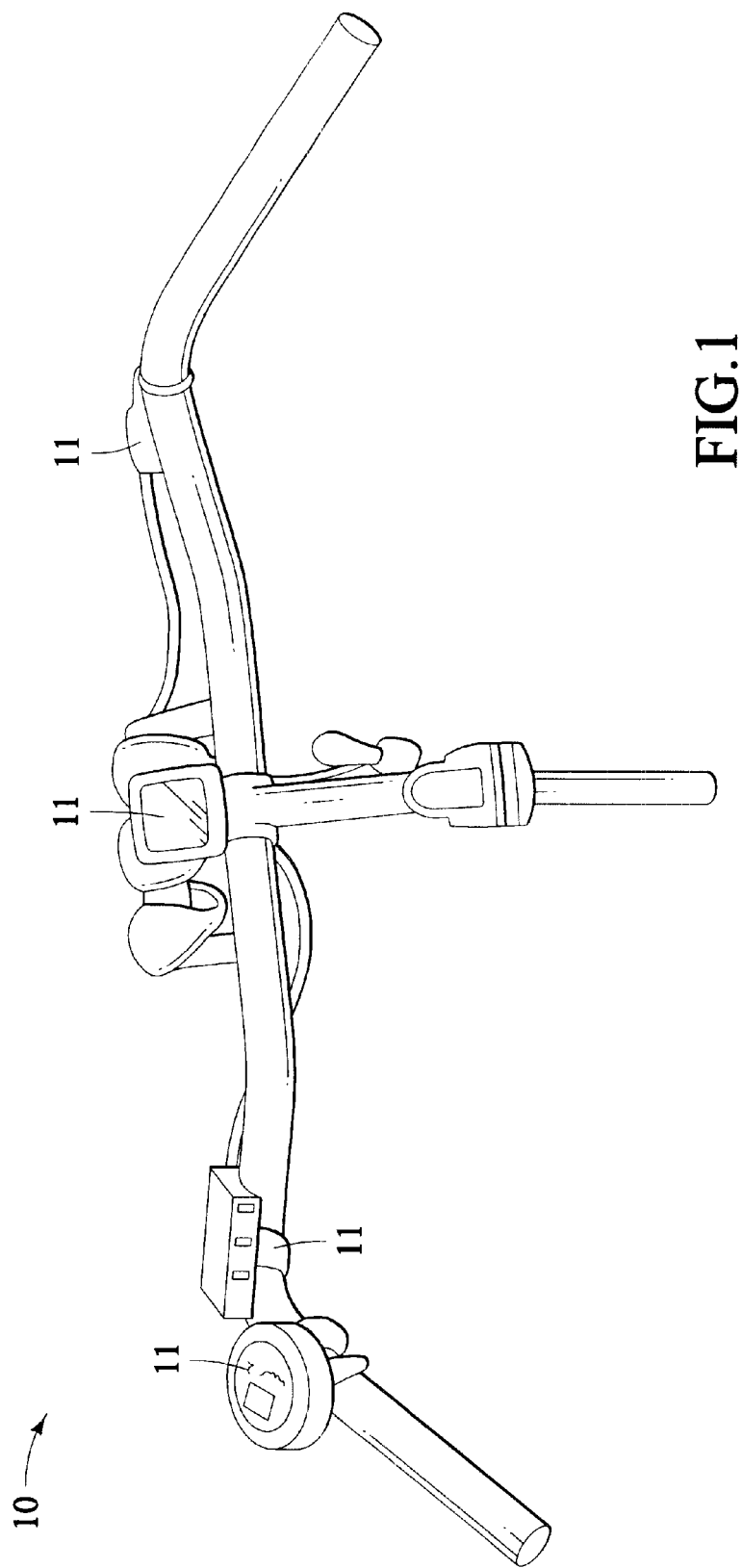
FIG. 1 is a top perspective view of a prior art bicycle handlebar assembly including a plurality of accessories.
Figure 2:
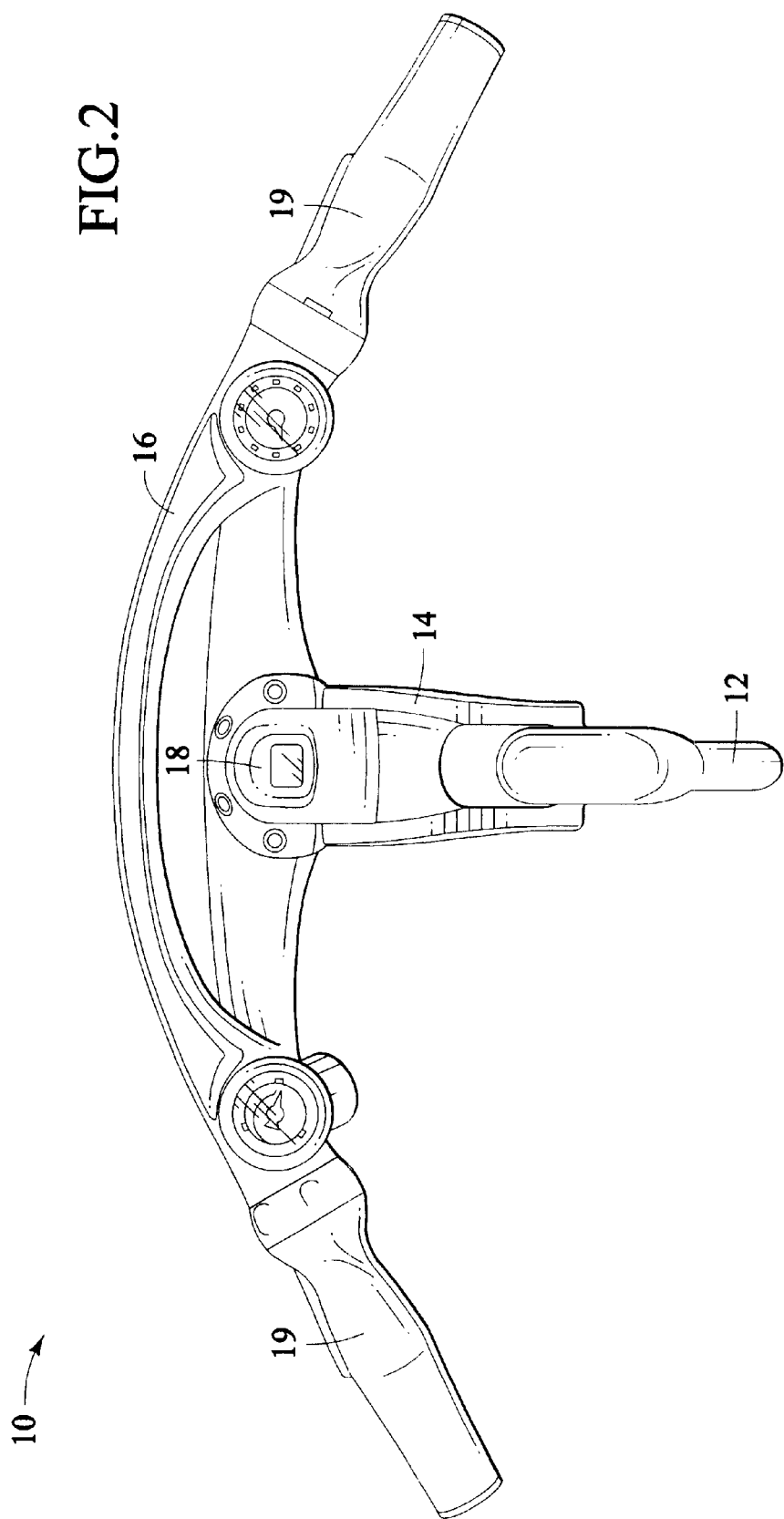
FIG. 2 is a top perspective view of an integrated rider control system in accordance with an exemplary embodiment of the present invention.
Figure 3:
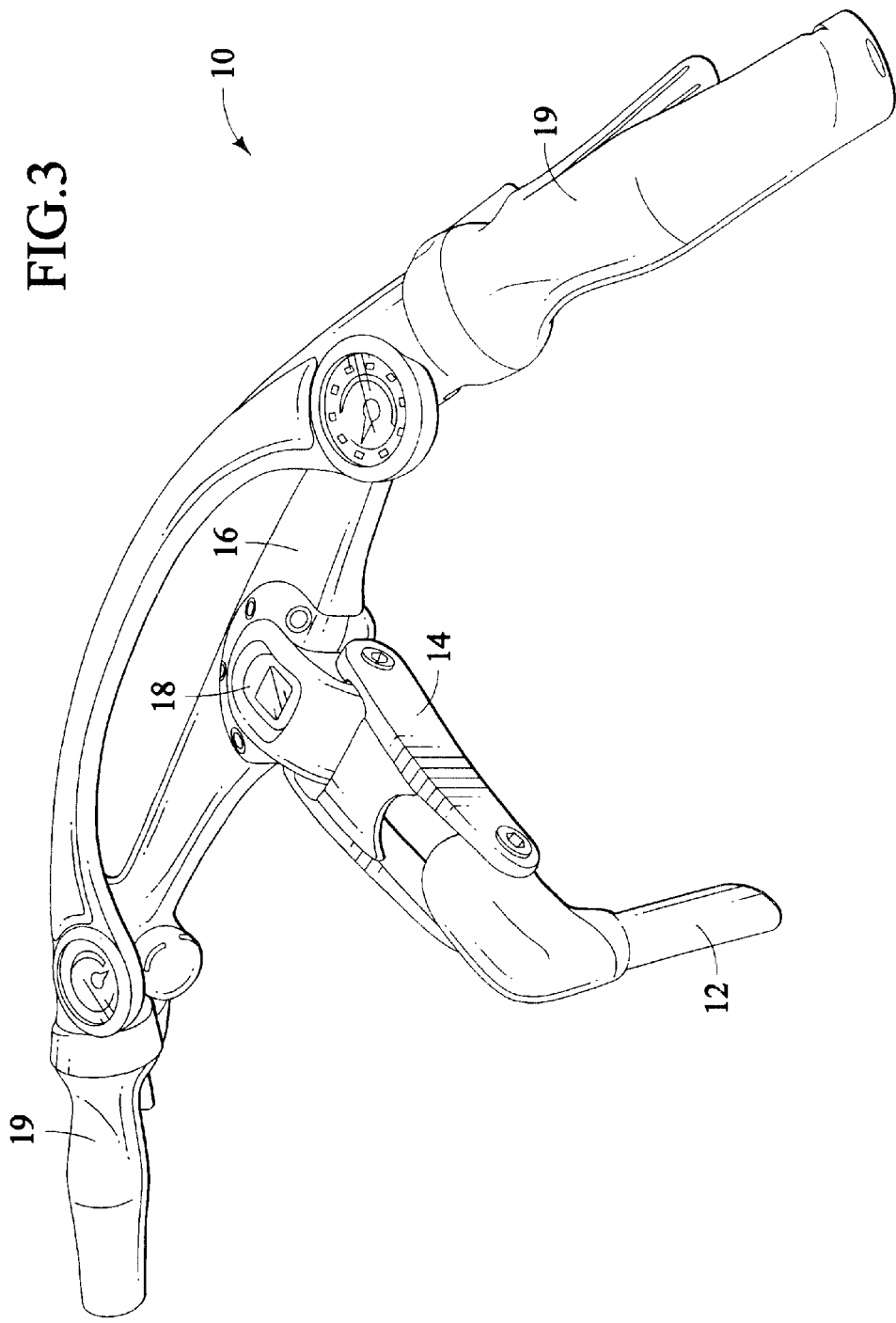
FIG. 3 is a rear, side perspective view of integrated rider control system of FIG. 2.
Figure 4:
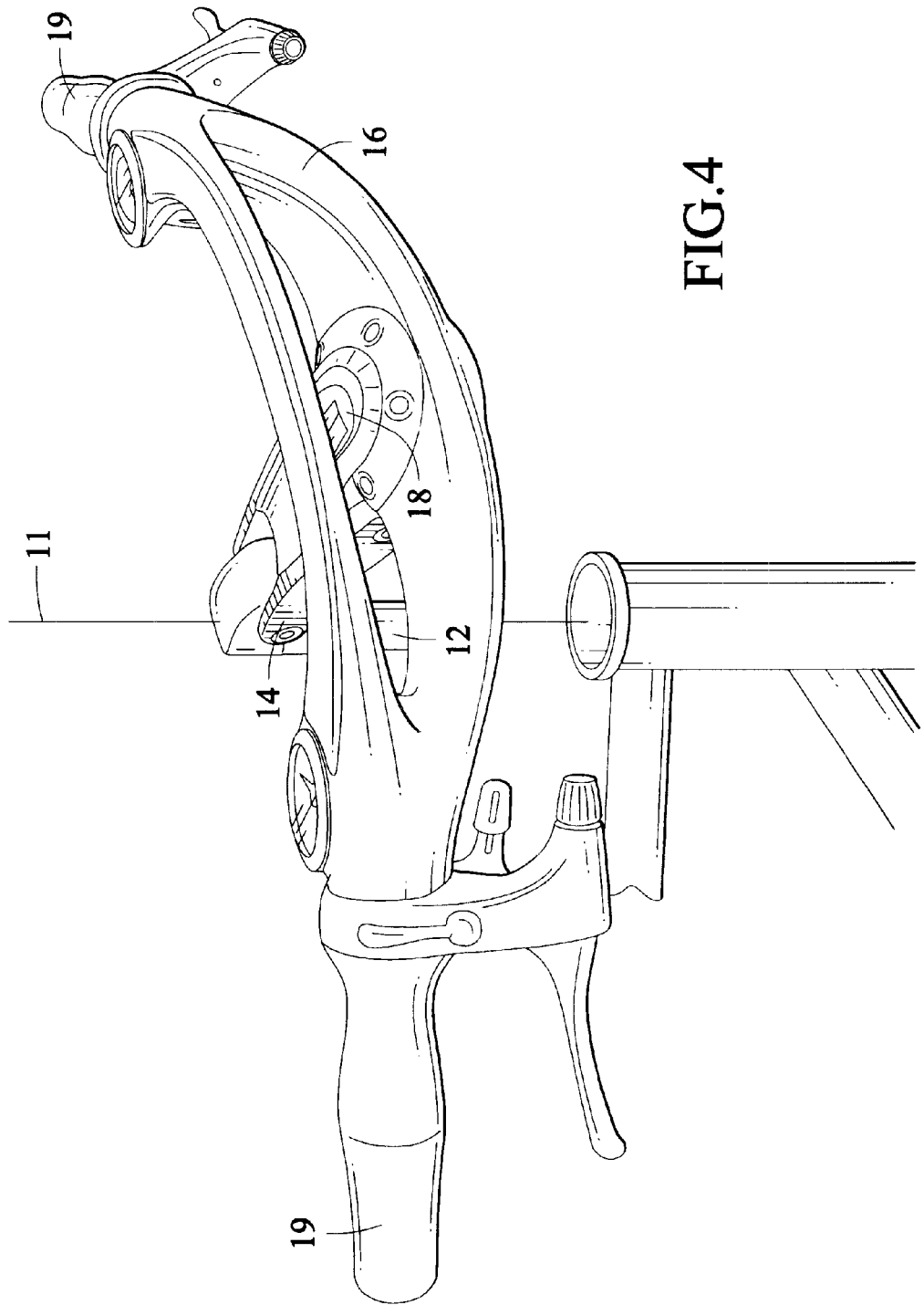
FIG. 4 is a front, side perspective view of integrated rider control system of FIG. 2.

FIGS. 2 through 6 illustrate one embodiment of an integrated rider control system 10 for handlebar steered vehicles. Handlebar steered vehicles can be bicycles, motorcycles, personal watercrafts, mopeds, snowmobiles, etc. As illustrated in FIG. 4, system 10 is configured to pivotally couple along a steering axis 11 to the handlebar steered vehicle. As illustrated FIG. 3, system 10 includes a stem 12, an extension 14, an integral support structure 16, at least one accessory, shown as a computer 18, and integrated brake gear shifters, shown as control pods 19.

Figure 5:
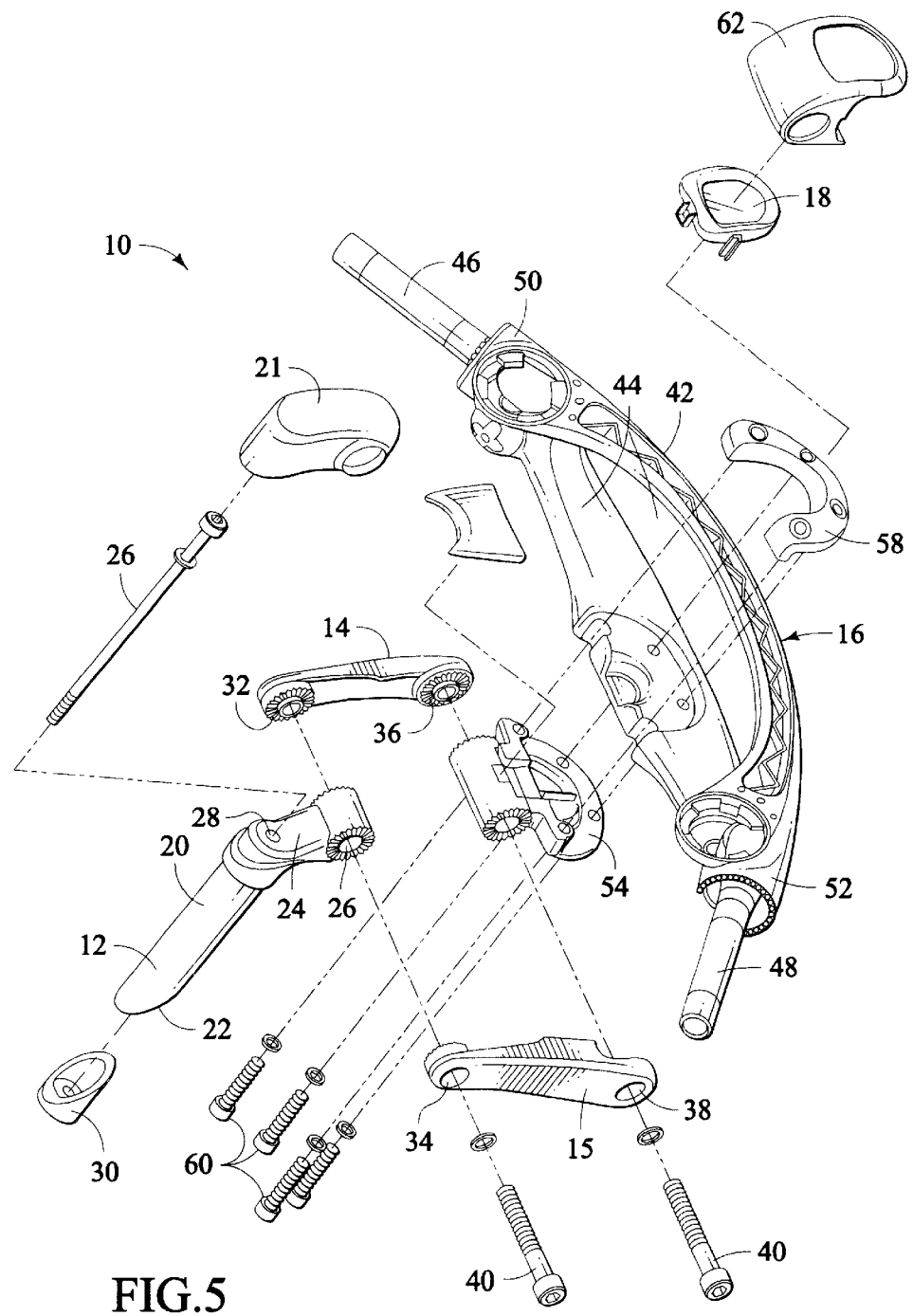
FIG. 5 is rear exploded perspective view of an integrated rider control system of FIG. 2.
Figure 6:
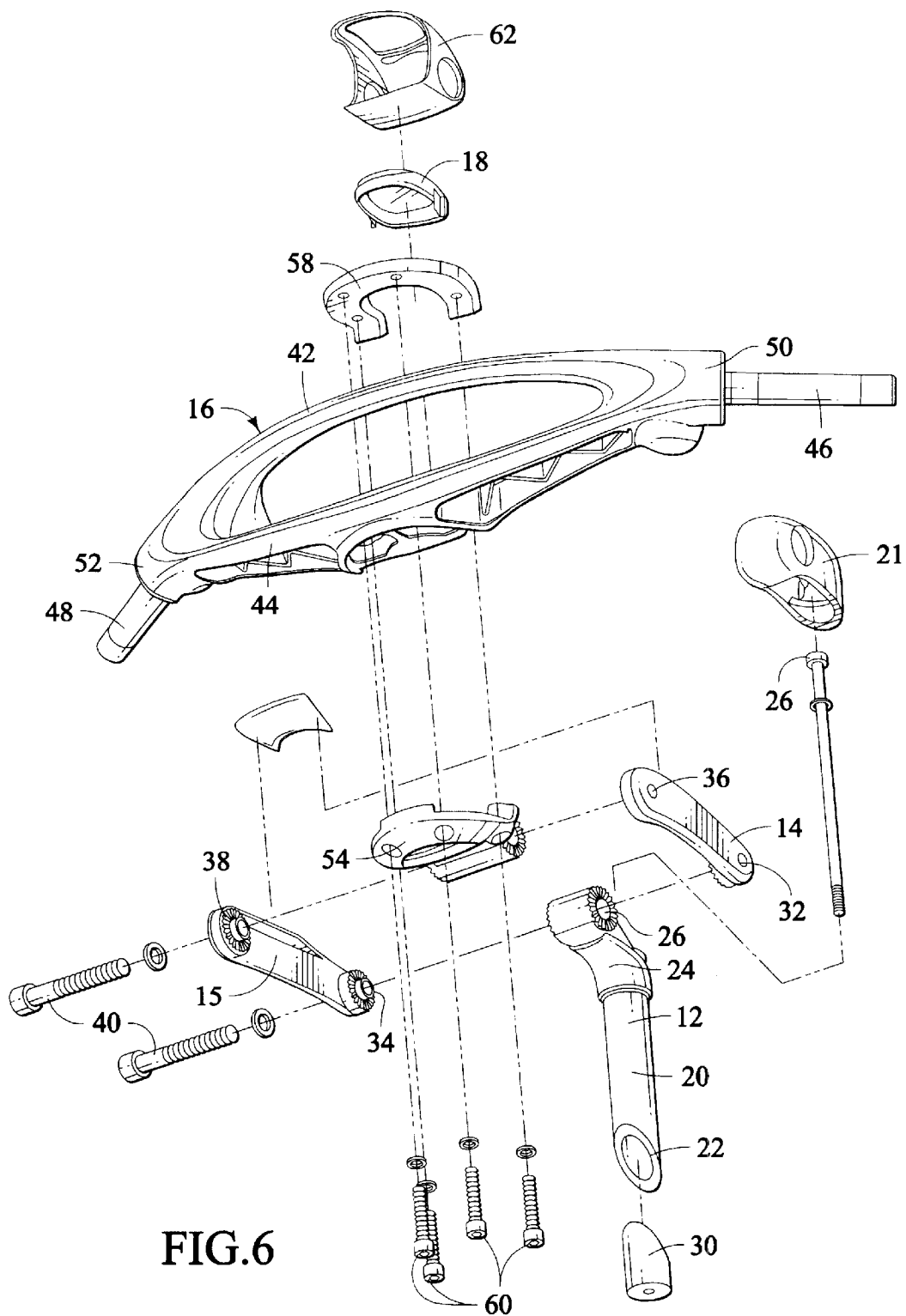
FIG. 6 is a front exploded perspective view of an integrated rider control system of FIG. 2.

As best illustrated in FIGS. 5 and 6, stem 12 is an elongate cylindrical hollow quill 20 having an obliquely cut frame end 22 and a distal end 24. Stem 12 is positioned at a forward end of the vehicle. In an exemplary embodiment, distal end 24 angularly projects from quill 20 and includes a distal end opening 26 transversely positioned with respect to a longitudinal axis of the vehicle. Quill 20 of stem 12 is configured to pivotally couple to and generally upwardly project from the frame (not shown) along the steering axis of the vehicle of the handlebar steered vehicle. Quill 20 includes an elongate bolt 26 extending through a longitudinal passage 28 of quill 20. Bolt 26 is configured to connect to a wedge 30 at frame end 22 of quill 20. During assembly, bolt 26 pulls wedge 30 up against oblique frame end 22 expanding the cross sectional area of stem 12 at frame end 22 of quill 20 until it removably binds with inner surfaces of a fork tube (not shown) of the vehicle. In an alternative embodiment, frame end 22 of quill can be configured to connect with outer surfaces of the fork tube. Stem 12 connects integrated rider control system 10 to the vehicle and supports extension 14 and integral support structure 16. Stem 12 is made of an impact modified, glass-filled nylon. Stem 12 can also be made of metal, aluminum, polymers, etc.

Figure 7A:
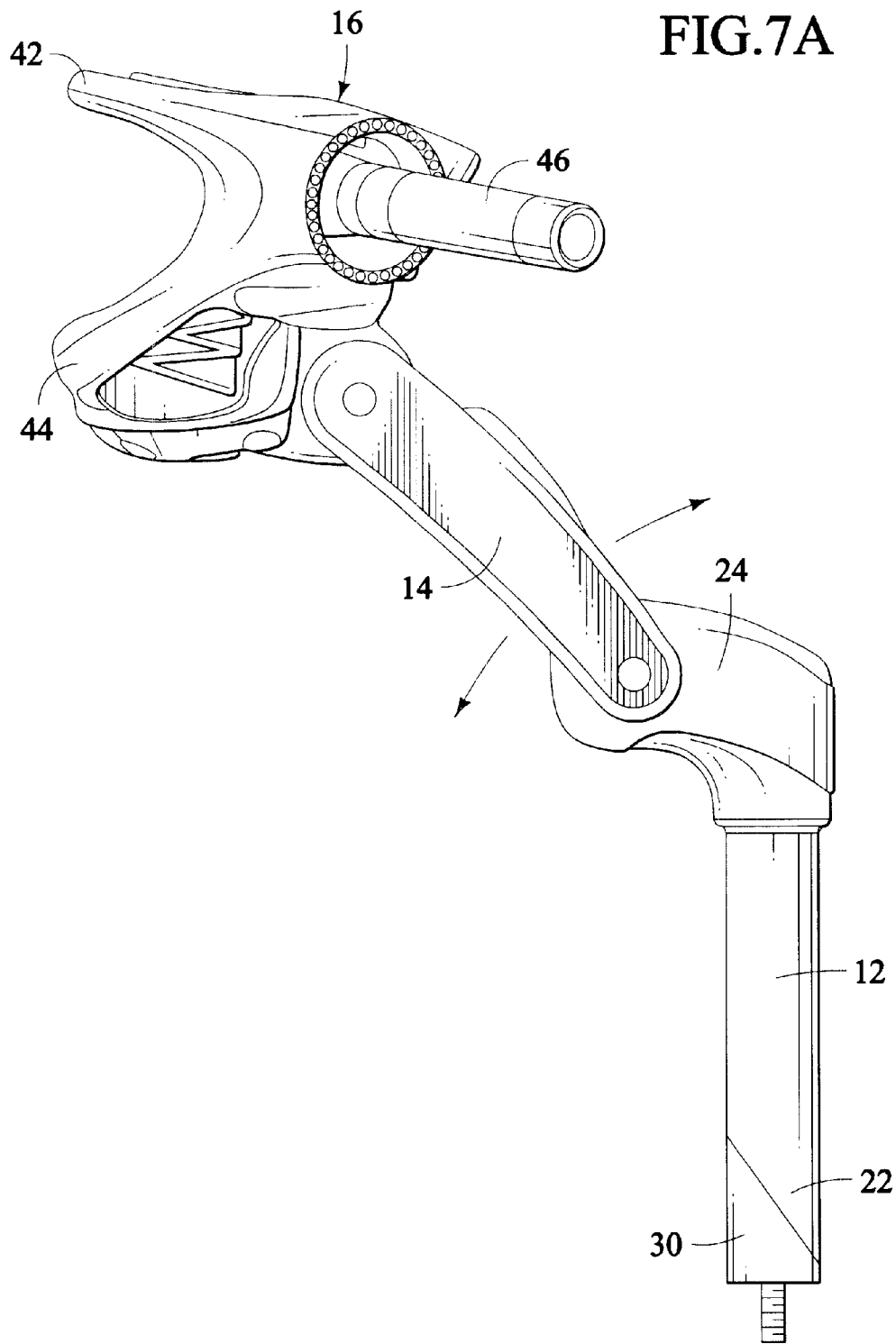
FIG. 7A is a side view of an integrated rider control system in accordance with an exemplary embodiment of the present invention with the stem in a forwardly extending position.

Distal end 24 of stem 12 is configured to be removably connected to the vehicle in at least two positions. In a first position as illustrated in FIG. 7A, distal end 24 projects forward translating extension 14 and integral support structure 16 forward. In a second position as illustrated in FIG. 7B, distal end projects rearward resulting in a rearward translation of the forwardly positioned extension 14 and integral support structure. As shown in FIGS. 7A and 7B, stem 12 allows rider to position extension 14 and structure 16 in a forward translated position or a rearward translated position thereby increasing the adjustable range of the system 10 available to the rider. System 10 is configured to adapt to the rider's stature and positioning needs. Quill 20 of stem 12 is configured to couple to the vehicle within an adjustable height range. In an exemplary embodiment, stem 12 has an adjustable height range of approximately 150 mm. In an exemplary embodiment, a quill cover 21 is connected to and substantially covers distal end 24 of stem 12. In an alternative exemplary embodiment, distal end 24 of stem upwardly projects along the longitudinal axis of quill 20.

Referring to FIGS. 5 and 6, extension 14 is at least one linkage. In an exemplary embodiment, the extension is comprised of juxtaposed first and second extensions 14, 15. First and second extensions 14, 15 includes a stem aperture 32, 34 at a first end and a support structure aperture 36, 38 at a second end. In an exemplary embodiment, stem aperture 32 and support structure aperture 36 are threaded to receive extension bolts 40. Extension bolt 40 connects first ends of first and second extensions 14, 15 to distal end 24 of stem 12. Extension bolt 40 couples second ends of first and second extensions 14, 15 to integral support structure 16. First and second extensions 14, 15 increase the adjustable range of system 10 by providing a wider adjustable range of motion of integral support structure 16 and thereby increasing the range of adjustment available to the user of the vehicle. First and second extensions 14, 15 are made of an impact modified, glass-filled nylon. First and second extensions 14, 15 can also be made of metal, aluminum, polymers, etc.

Integral support structure 16 an elongate member. In an exemplary embodiment, structure 16 includes a plurality of receptacles and mounting surfaces configured to integrally receive or integrally attach to the equipment. Equipment include accessories, controls and displays. Structure 16 further includes upper and lower spars 42, 44, and left and right mandrels 46, 48 outwardly projecting from left and right ends 50, 52 of structure 16. Lower spar 44 of structure 16 is coupled to first and second extensions 14, 15. Extension bolt 40 extends through second extension 15, a lower clamp 54 and connects to first extension 14. Lower clamp 54 has a planar, semi-circular shape with a plurality of apertures. Computer 18 is disposed onto lower clamp 54 and lower spar 44. An upper clamp 58 having a semi-annular shape and including a plurality of apertures is placed over computer 18. Clamp bolts 60 fasten structure 16 to first and second extensions 14, 15 and secure computer 18 between extensions 14, 15 and structure 16. In an exemplary embodiment, a clamp cover 62 made of elastomeric material is connected to and partially covers upper and lower clamps 54, 58, first and second extensions 14, 15 and integral support structure 16.

Integral support structure 16 is an injection molding made of impact modified, glass-filled nylon. In an exemplary embodiment, structure 16 is made of fifty percent (50%) glass nylon with elastomeric impact modifiers. In an alternative exemplary embodiment, structure 16 is made glass and carbon filled nylon. Structure 16 can also include short and long glass fibers. Structure 16 can also be made of metal, aluminum, polymers, etc. Structure 16 can also be made by compression molding, gas assist injection molding etc.

Integrated rider control system 10 is an integrated, modular and adjustable platform. System 10 provides a completely new vehicle defining aesthetic, enhances the ergonomic fit of the rider to the vehicle, enhances the ergonomic function and accessibility of the equipment, such as controls, accessories and displays, and provides upgradeability with modular, fully integrated controls, accessories and accessory controls.

II. Integral Support Structure

Figure 10:
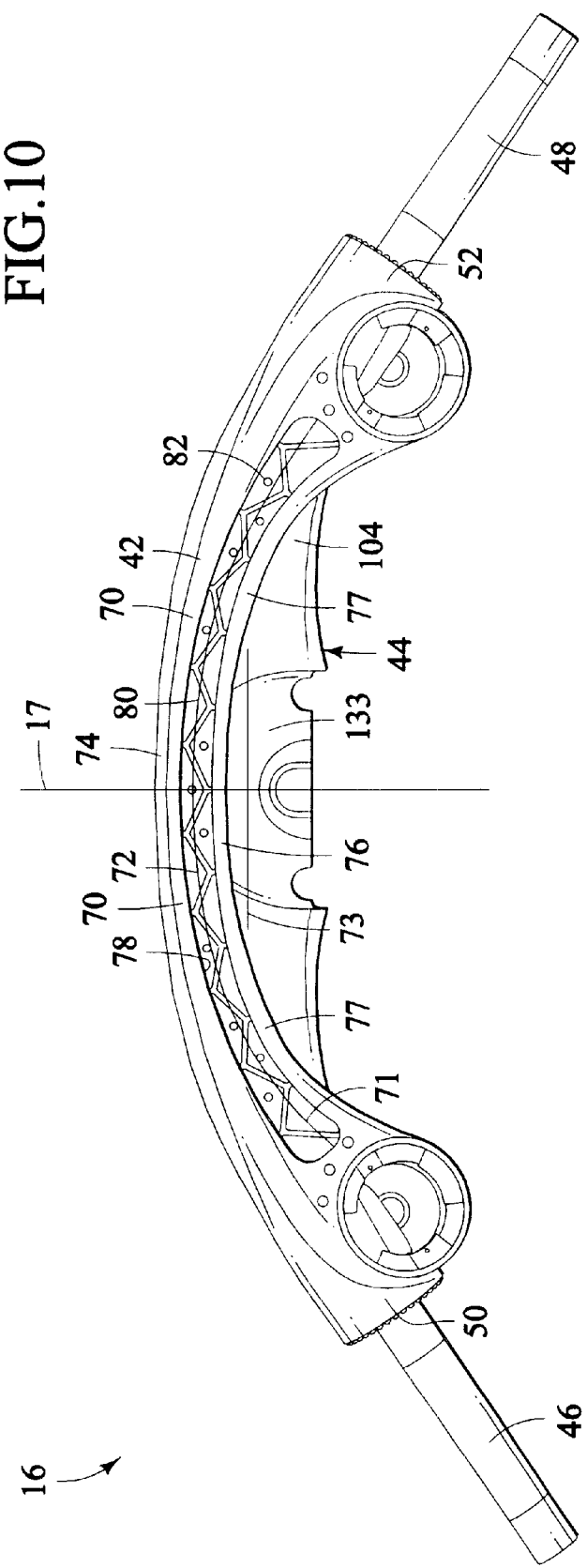
FIG. 10 is a top view of the integral support structure of FIG. 8.
Figure 11:
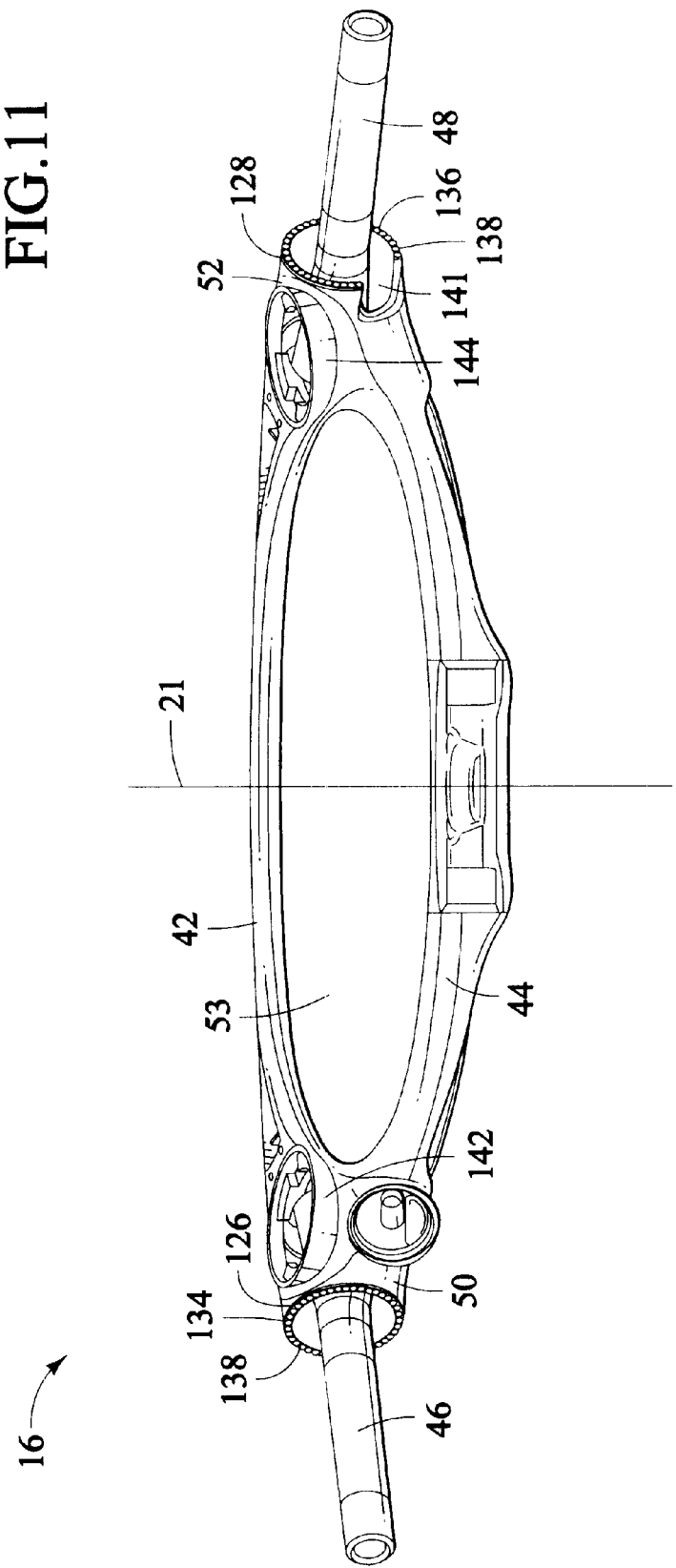
FIG. 11 is a rear view of the integral support structure of FIG. 8.

FIGS. 8 through 12 illustrate integral support structure 16 in greater detail. Referring to FIGS. 10 and 11, structure 16 is an elongate frame configured to transversely extend across a longitudinal centerline 17 of the vehicle. Structure 16 is substantially symmetrical about a vertical plane 21 extending through centerline 17 of the vehicle. Structure 16 is adapted to integrally support equipment for handle bar steered vehicle. Equipment include accessories, controls and displays. Structure 16 includes a plurality of receptacles and mounting surfaces configured to integrally receive or integrally attach to the equipment. The receptacles and mounting surfaces of structure 16 allow for the equipment to be integrally installed on to structure 16 with a plurality of different viewing aspects for the rider of the vehicle. In an exemplary embodiment illustrated in FIG. 9, structure 16 includes upper and lower spars 42, 44, left and right ends 50, 52, and left and right mandrels 46, 48. Upper and lower spars 42, 44 and left and right ends 50, 52 define an elongate oval opening 53.

Figure 8:
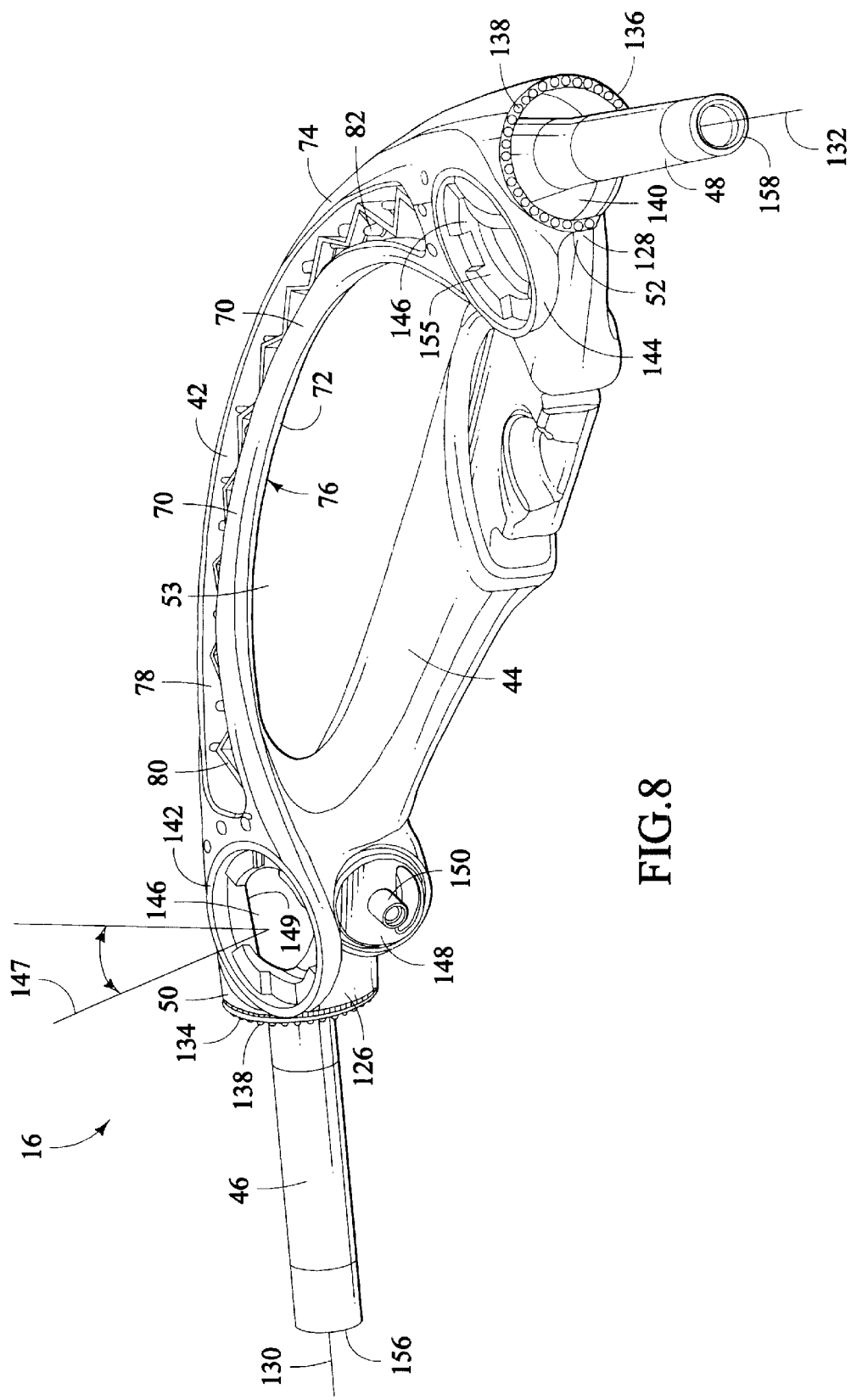
FIG. 8 is a rear perspective view of an integral support structure in accordance with an exemplary embodiment of the present invention.
Figure 9:
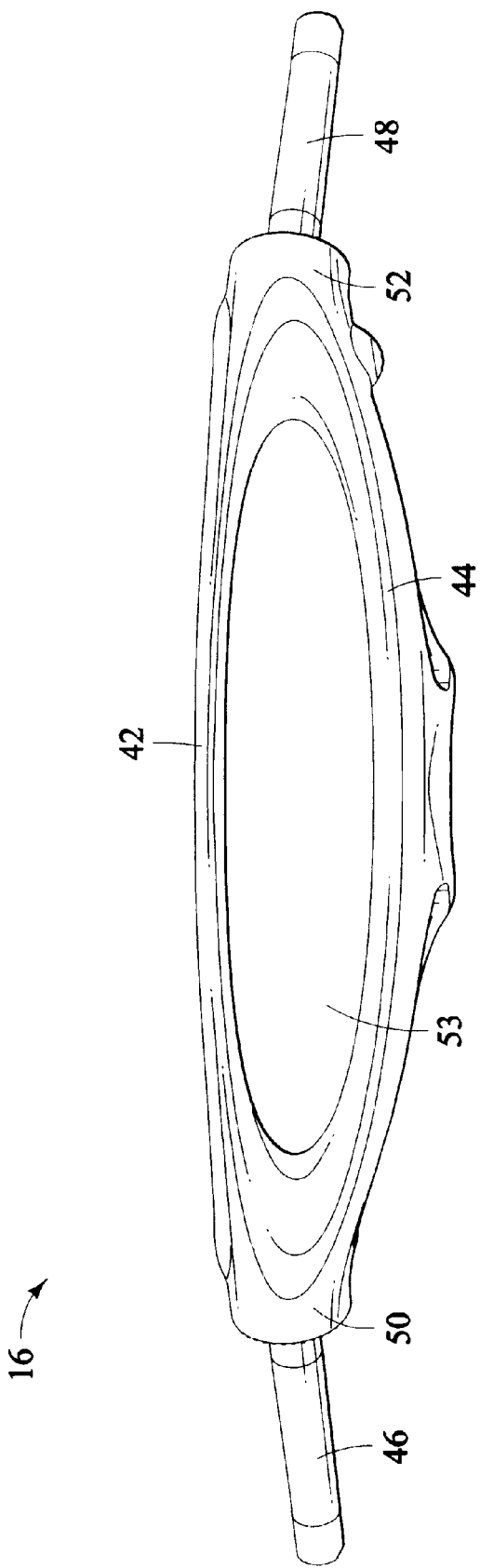
FIG. 9 is a front view of the integral support structure of FIG. 8.
Figure 15:
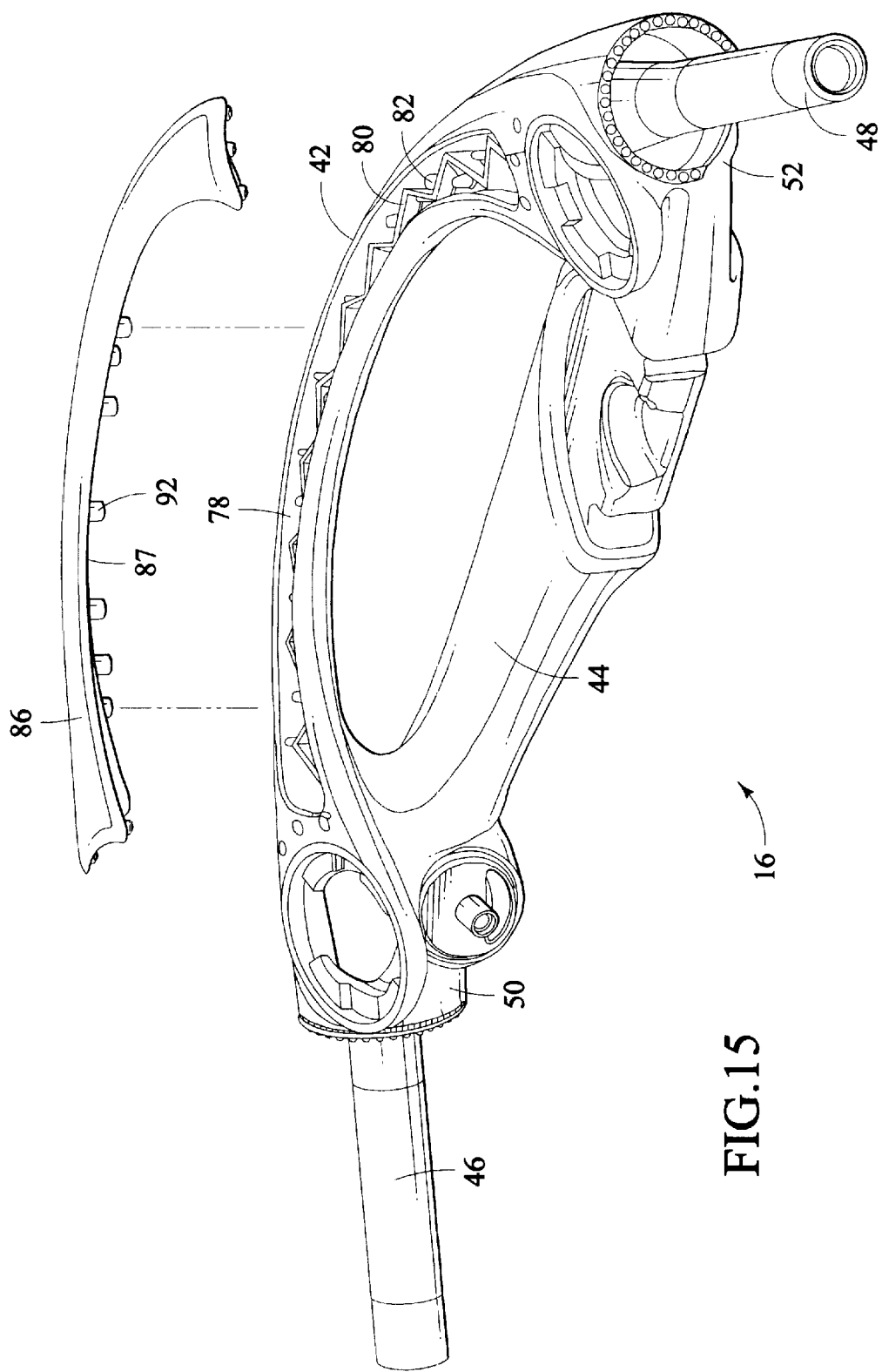
FIG. 15 is a rear perspective exploded view illustrating attachment of the cushionable cover to the integral support structure of FIG. 8.

FIGS. 8 and 10 illustrate upper spar in greater detail. Upper spar 42 is a generally planar elongate member. Upper spar 42 is integrally formed between left and right ends 50, 52 and is substantially superimposed with lower spar 44. Upper spar 42 provides mounting surfaces and receptacles for the integral attachment of and the routing of cables between the equipment. Upper spar 42 is a substantially non-load bearing member in relation to lower spar 44. Upper spar 44 provides a secondary load bearing support to lower spar 44 of structure 16. Upper spar 42 includes gripping surfaces 70 configured for grasping by the user during operation of the vehicle. A lower planar surface 72 and front and rear side surfaces 74, 76 of upper spar 42 define an elongate channel 78 within upper spar 42. A plurality of interconnecting trusses 80 and pins 82 upwardly extend from lower surface 72 of upper spar 42. Trusses 80 increase the strength of upper spar. As best illustrated in FIGS. 10 and 15, pins 82 provide a fastening means for a cushionable cover 86. In an alternative exemplary embodiment, upper spar 42 includes a central boss configured to support computer 18.

Figure 16:
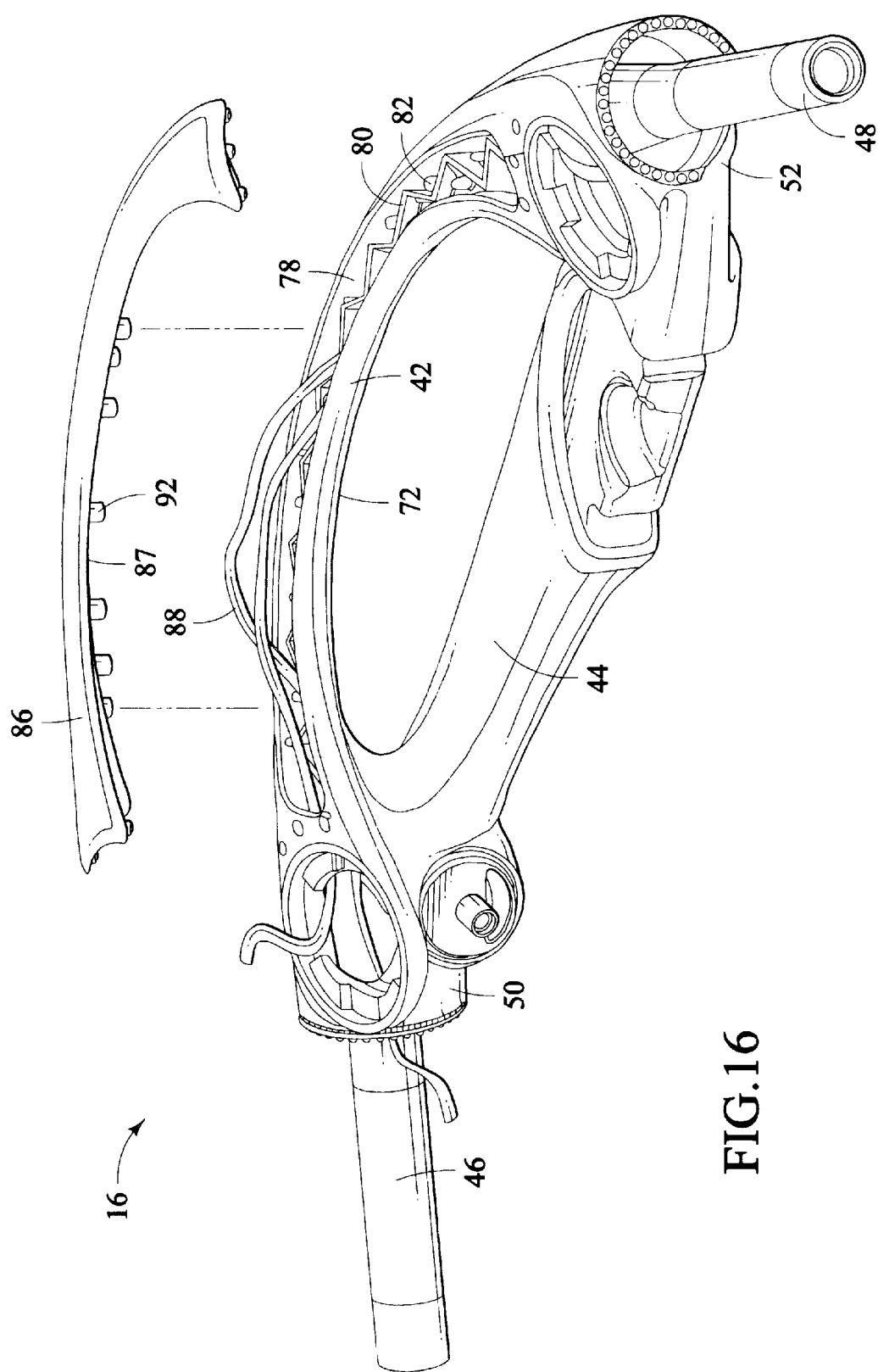
FIG. 16 is a rear perspective partially exploded view illustrating cable routing within the integral support structure of FIG. 8.
Figure 17:
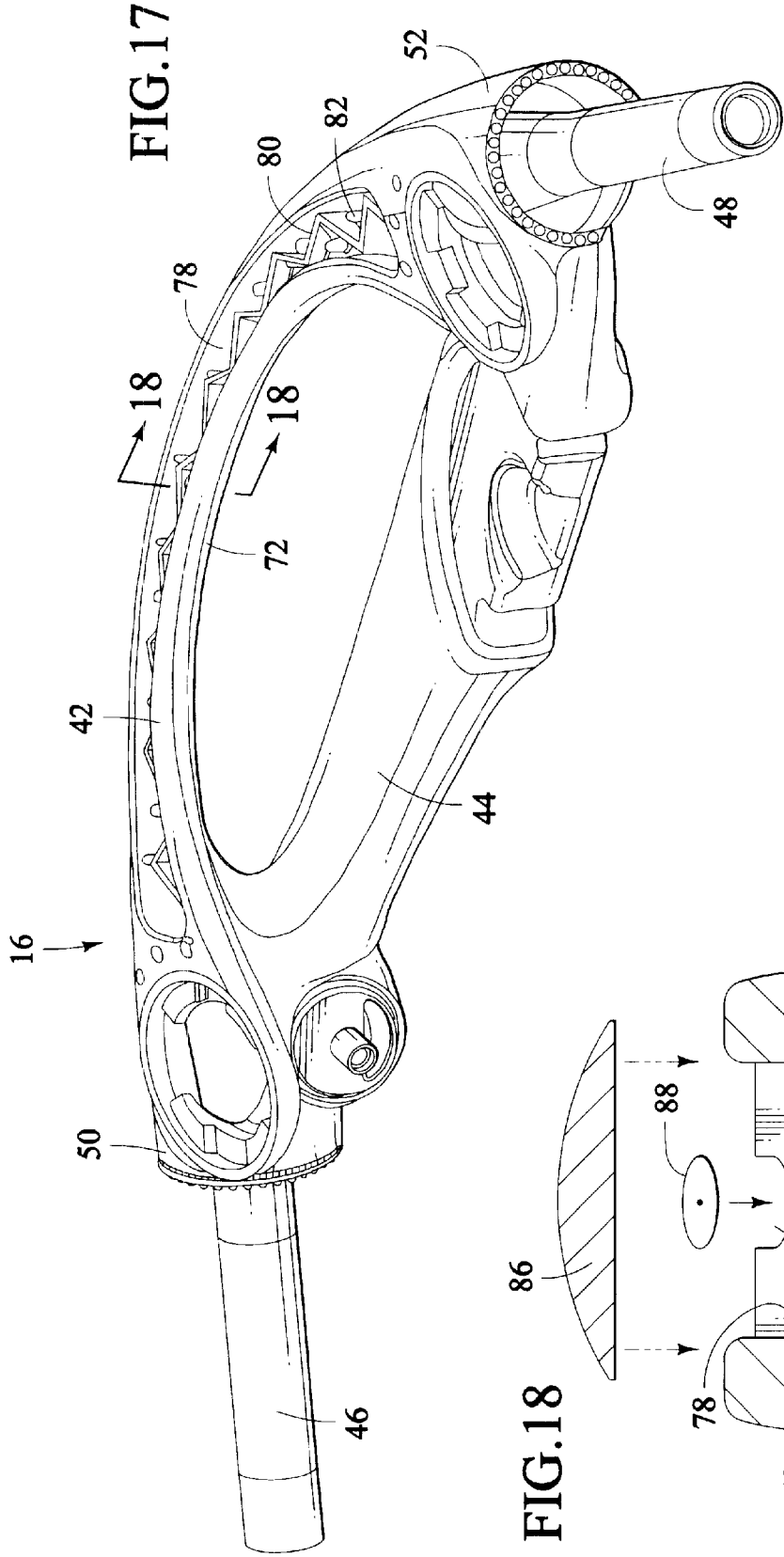
FIG. 17 is a rear perspective view of an integral support structure in accordance with an exemplary embodiment of the present invention.
Figure 18:
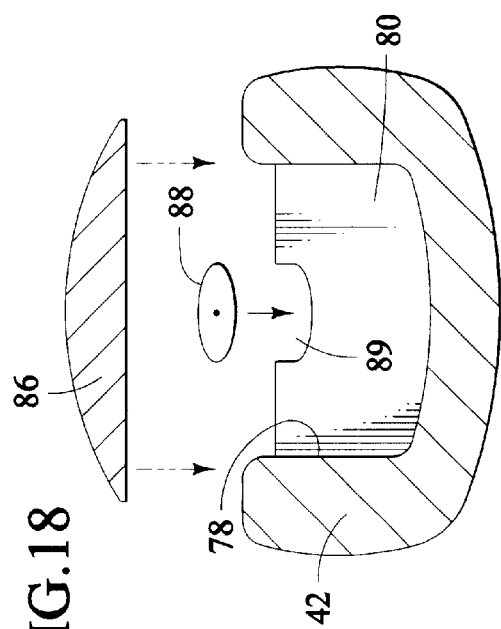
FIG. 18 is a cross-sectional view of an upper spar of the integral support structure taken substantially along line 18—18 of FIG. 17.
Figure 21:
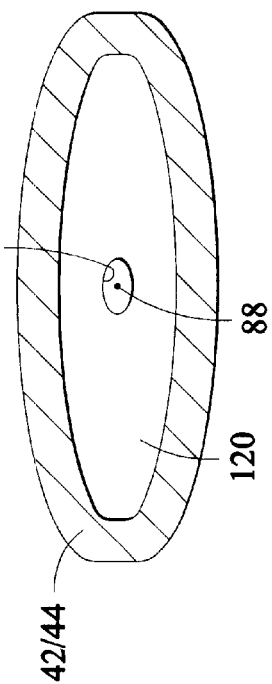
FIG. 21 is a cross-sectional view of a lower spar of the integral support structure taken substantially along line 21—21 of FIG. 20.

FIGS. 16 through 18 illustrates channel 78 in greater detail. Channel 78 provides a receptacle for integrally receiving at least one supplemental device. Channel 78 further provides a passage for the integral routing of at least one cable 88 between equipment within upper spar 42. In an exemplary embodiment illustrated in FIG. 18, a notch 89 is defined in a plurality of trusses 80 to accommodate cable 88. Cable 88 can include a housing and one or more wires. Cable 88 is integrally secured within upper spar 42 between notches 89 in trusses 80 and cushionable cover 86. In an alternative exemplary embodiment, as illustrated in FIG. 21, a hole 90 is defined in at least one truss 80 of upper or lower spar 42, 44 to accommodate cable 88. The cable routing methods described above allow structure 16 to be used for integrally attaching equipment and integrally routing cables 88 between the equipment. The integral routing of cables 88 eliminates or minimizes the risk of cables 88 becoming entangled with a foreign object or the rider. Additionally, the integral routing of cables prevents moisture and debris from contacting the integrally routed cables 88. In an alternative exemplary embodiment, upper spar 42 substantially hollow in construction and does not include trusses 80. In another alternative exemplary embodiment, upper spar 42 includes strengthen members having arcuate or irregular shapes. Additional holes can be drilled through lower surface 72 of upper spar 42 to facilitate integral fastening of the equipment to upper spar 42.

Figure 13:
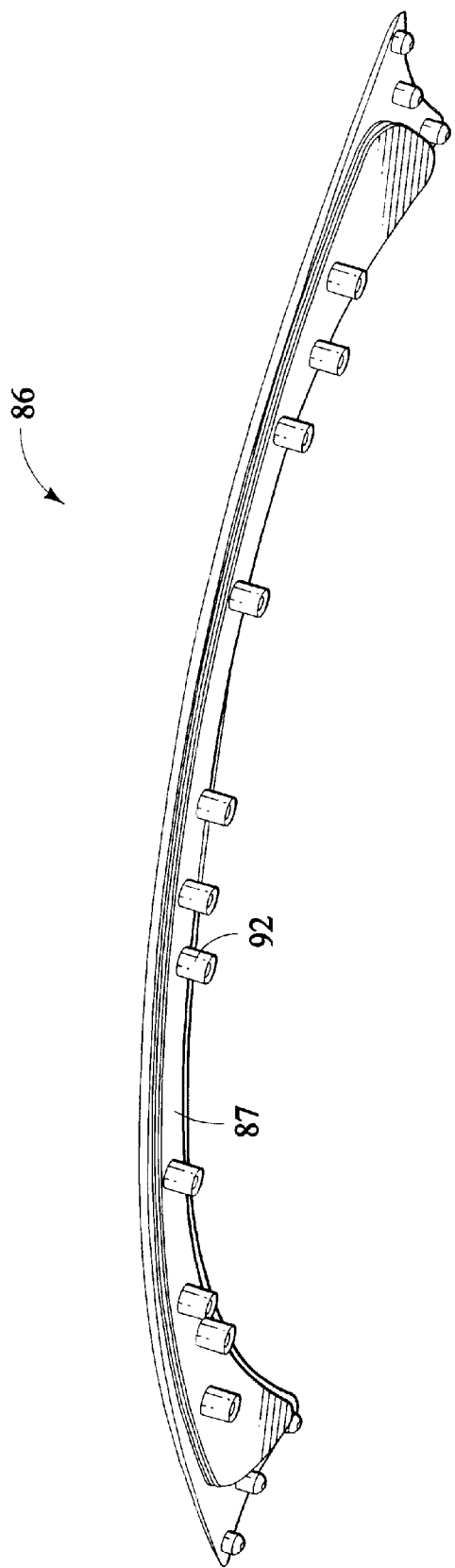
FIG. 13 is a perspective view of a cushionable cover in accordance with an exemplary embodiment of the present invention.
Figure 14:
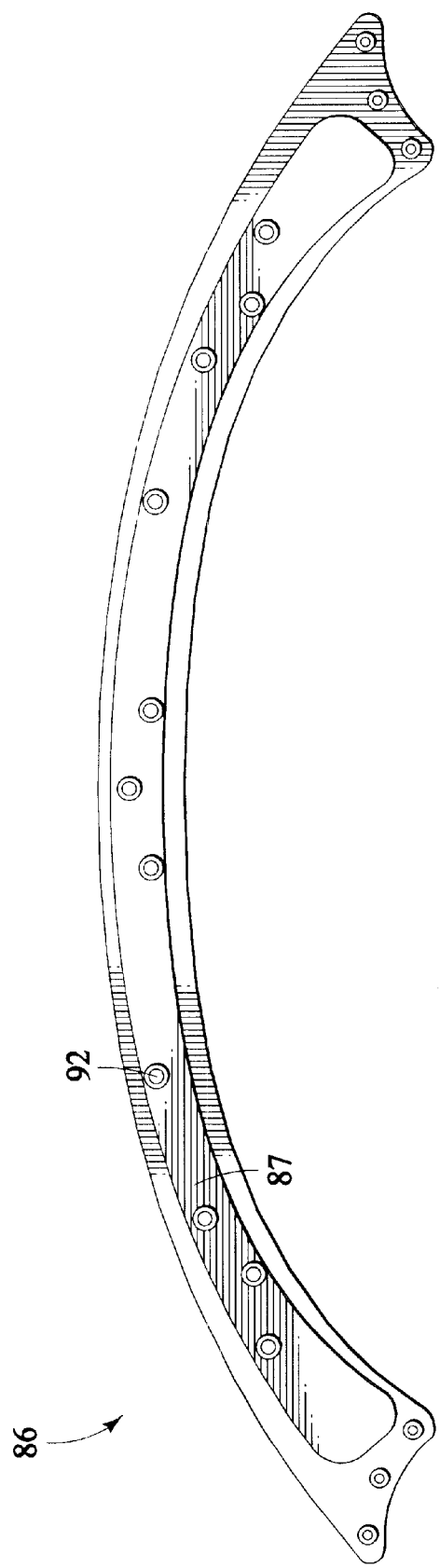
FIG. 14 is a bottom view of the cushionable cover of FIG. 13.

FIGS. 13 and 14 illustrate cushionable cover 86. Cushionable cover 86 is a flexible, elongate sheet of resilient, tactile material. Cover 86 includes a lower surface 87 having a plurality of downwardly projecting bosses 92. Each boss 92 having a longitudinally extending bore. As illustrated in FIGS. 15 and 16, cover 86 connects to upper spar 42, substantially covering channel 78. Bosses 92 are configured to engage pins 82 and provide a removable friction fit of cover 86 to upper spar 42. As best shown in FIGS. 16 and 18, cover 86 facilitates the integral attachment of fasteners and cables 88 within upper spar 44. Cover 86 prevents moisture from entering channel 78 of upper spar 42 thereby protecting cables 88 and the fasteners. Cover 86 provides a smooth, tactile upper surface to upper spar 42. Cover 86 is made of an elastomeric, resilient material such as rubber. Alternatively, cover 86 can be made of other materials, such as plastic, etc. Cover 86 can be made in a variety of different colors to match the color scheme of the vehicle or other object. In an alternative embodiment, cushionable cover 86 can comprise multiple covers, can be modular and come in a variety of alternate shapes and sizes. Cover 86 provides a unique aesthetic to structure 16 and integrated rider control system 10.

Figure 19A:
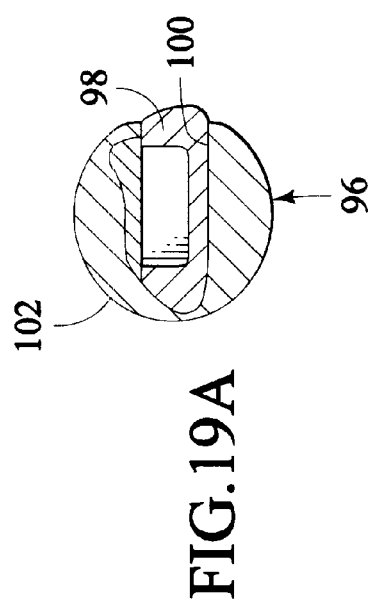
FIG. 19A is a cross-sectional view of a handlebar adapter in accordance with an exemplary embodiment of the present invention.
Figure 19:
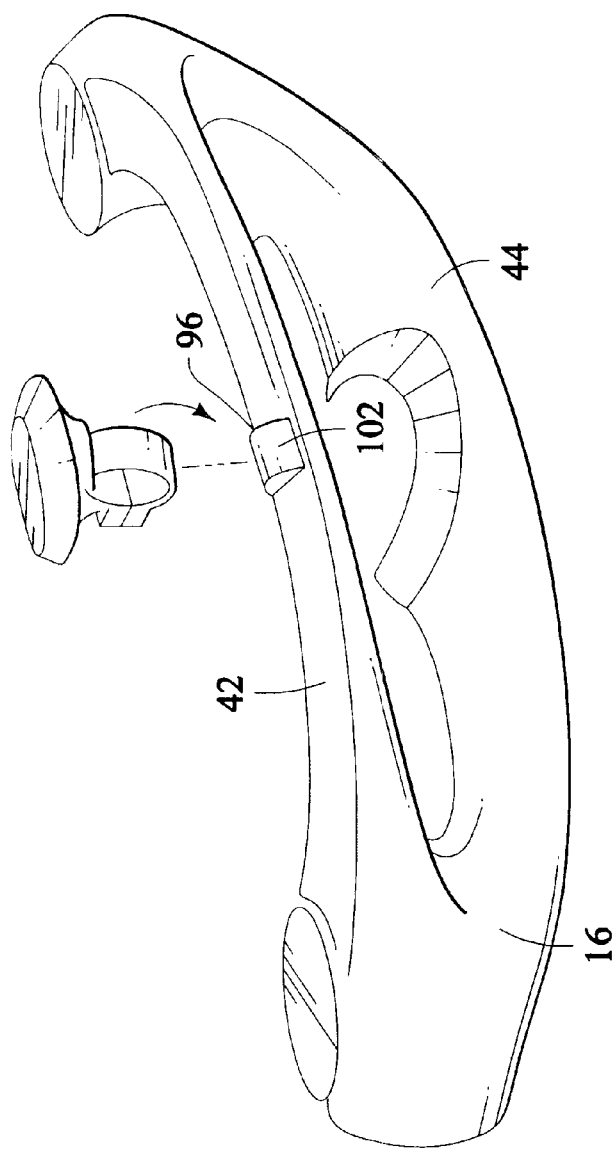
FIG. 19B is a front perspective view of the integral support structure illustrating the attachment of an accessory to the handlebar adapter of FIG. 19A.

As illustrated in FIGS. 19A and 19B, upper spar 42 can also include a standard handlebar adapter 96. Adapter 96 is a ring. Adapter 96 is configured to removably connect to upper spar 42. Adapter 96 is made of a resilient material. Adapter 96 is configured to fit around upper spar 42 and to provide a secure cylindrical mounting surface equivalent to that of a standard cylindrical handlebar. Adapter 96 allows for conventional handlebar mounted accessories to be connected to structure 16. Adapter 96 includes a slot 98, an irregular inner surface 100 and a substantially cylindrical outer surface 102. Slot 98 is configured to resilient expand allowing adapter 96 to fit over upper spar 42. Irregular inner surface 100 is configured to substantially engage upper spar 42. Outer surface 102 is configured to replicate the shape and size of standard cylindrical handlebars. In an exemplary embodiment, adapter 96 is made in at least two sizes: 22.2 mm and 25.4 mm. In an alternative embodiment, adapter 96 can be a hinged device. In another alternative embodiment, adapter 96 comprises at least two arcuate parts coupled to form the adapter.

Figure 12:
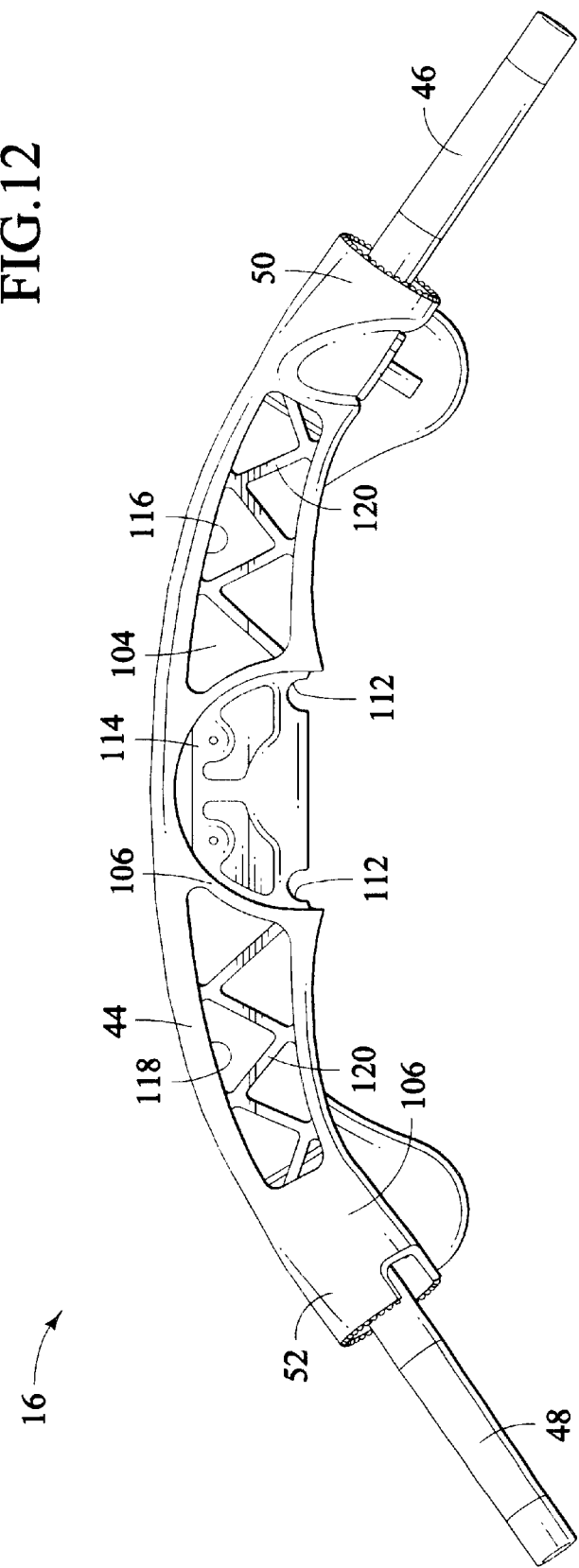
FIG. 12 is a bottom view of the integral support structure of FIG. 8.
Figure 20:
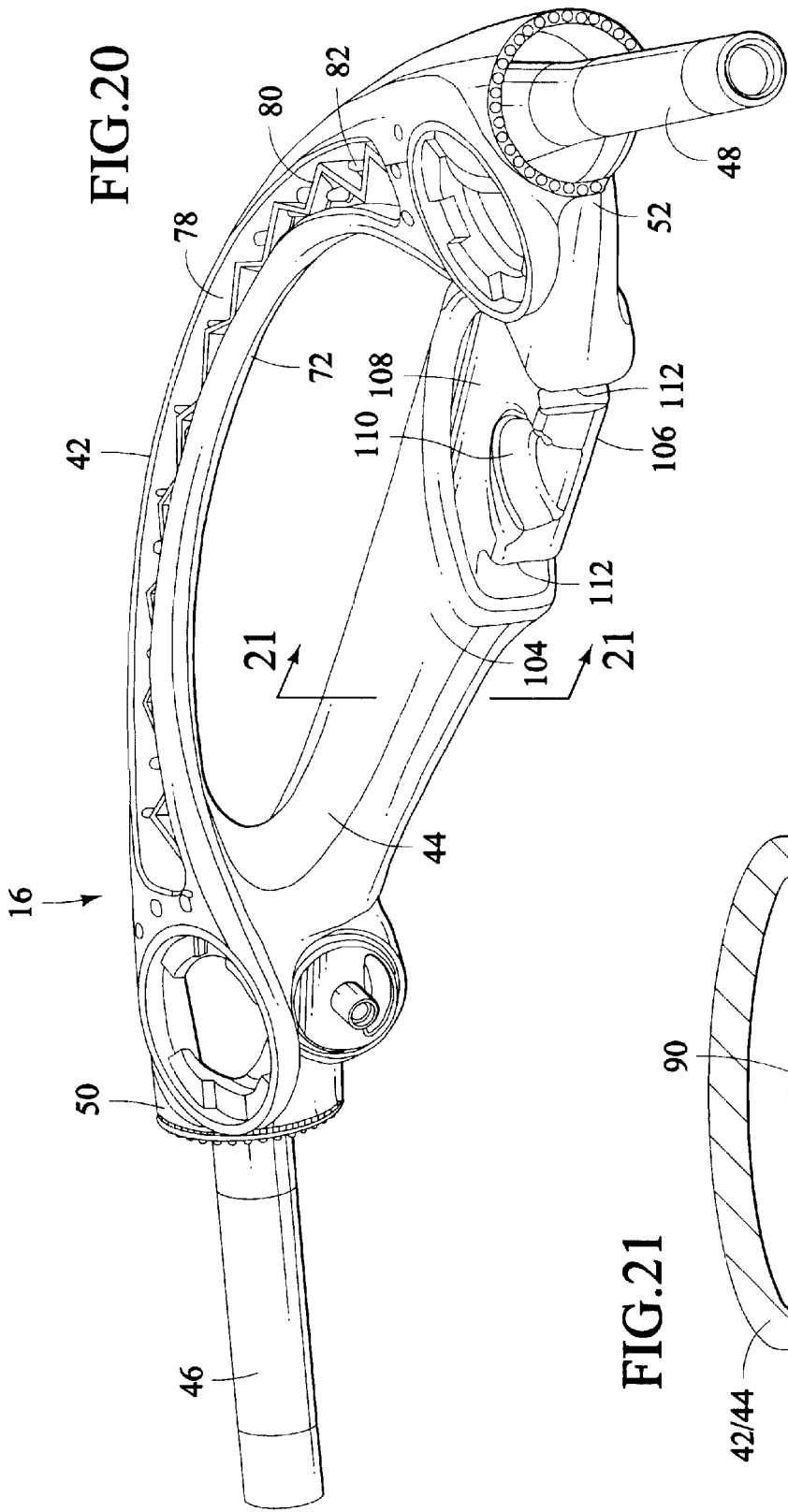
FIG. 20 is a rear perspective view of an integral support structure in accordance with an exemplary embodiment of the present invention.

FIGS. 12 and 20 illustrate lower spar 44 in greater detail. Lower spar 44 is a generally planar elongate member having a generally planar upper surface 104 and an arcuate lower surface 106. Lower spar 44 is integrally formed between left and right ends 50, 52. Lower spar 44 is configured to couple to first and second extensions 14, 15. In operation, lower spar 44 is the primary load bearing member of structure 16. Upper surface 104 includes major and minor arcuate recesses 108, 110. Major and minor arcuate recesses 108 are configured to partially receive and support computer 18. A pair of slots 112 extend from upper surface 104 to lower surface 106 and are configured to accommodate clamp bolts 60 for the attachment of extensions 14, 15 to lower spar 44.

FIG. 12 illustrates lower surface 106 of lower spar 44 in greater detail. Lower surface 106 of lower spar 44 includes a lower semi-circular recess 114 configured to engage lower clamp 54. Left and right lower channels 116, 118 are defined into lower spar 44. Left and right lower channels 116, 118 are open at lower surface 106 and include a plurality of lower trusses 120 downwardly extending from upper surface 104 of lower spar 44. Lower trusses 120 strengthen lower spar 44.

Figure 22:
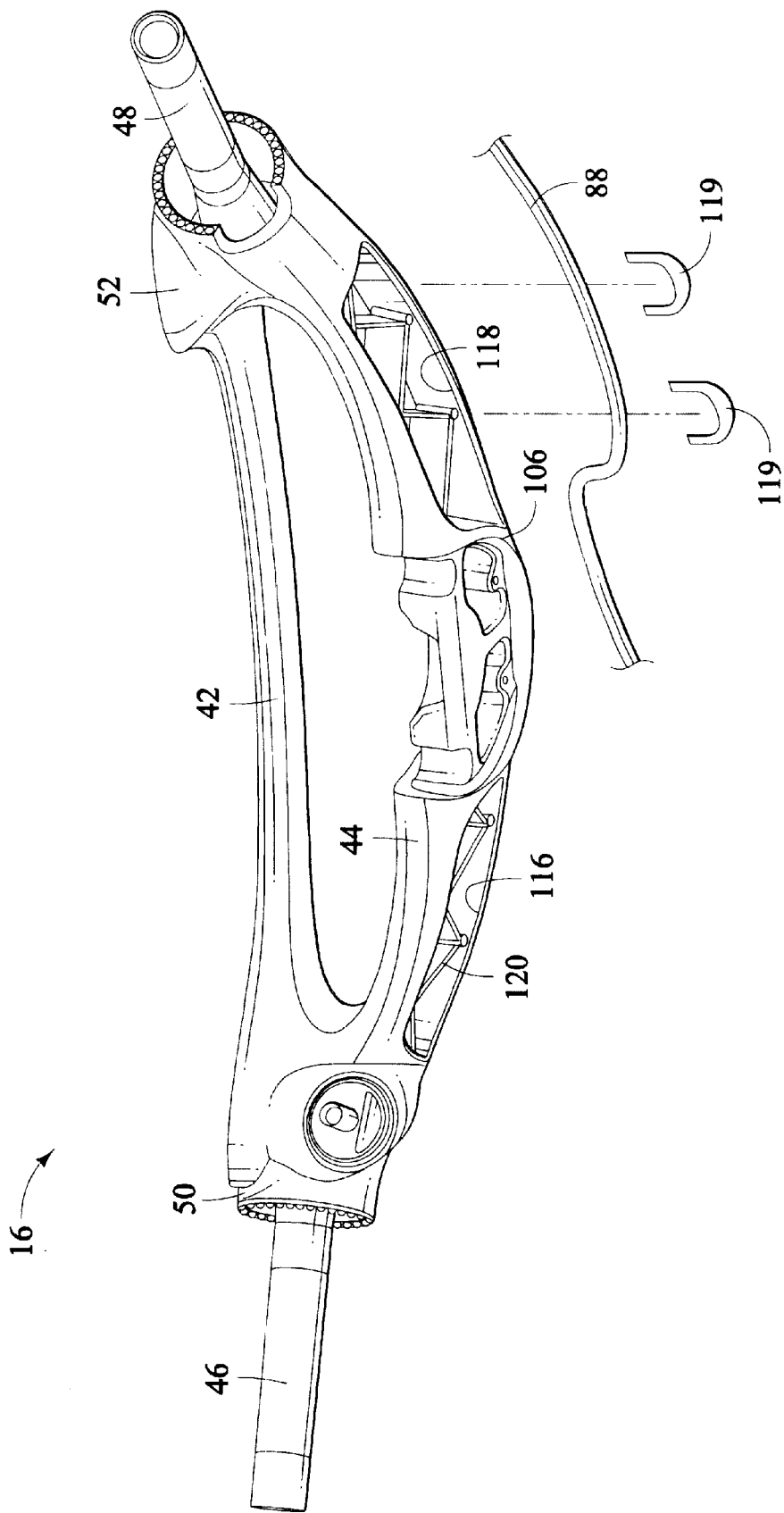
FIG. 22 is rear exploded view of the integral support structure of FIG. 20 illustrating the cable attachment to the lower spar of the integral support structure.

Left and right lower channels 116, 118 provide receptacles configured to integrally receive the equipment and cables 88. In one exemplary embodiment as illustrated in FIG. 21, a hole 90 is defined within at least one lower truss 120 to accommodate at least one cable 88. In an alternative exemplary embodiment as illustrated in FIGS. 22 through 24, cable 88 can be routed through one of left and right lower channels 116, 118 and secured within channels 116, 118 by at least one retaining clip 119 removably connected over cable 88 and to lower truss 120. The cable routing methods described above allow structure 16 to be used for integrally attaching equipment and integrally routing cables 88 between the equipment. The integral routing of cables 88 eliminates or minimizes the risk of cables 88 becoming entangled with a foreign object or the rider. Additionally, the integral routing of cables prevents moisture and debris from contacting the integrally routed cables 88. Additional holes can be defined through upper surface 104 of lower spar 44 into one of left and right lower channels 116, 118 to facilitate the integral fastening of the equipment to lower spar 44. In an alternative exemplary embodiment, lower spar 44 substantially hollow in construction and does not include lower trusses 120. In another alternative exemplary embodiment, lower spar 44 includes strengthen members having arcuate or irregular shapes.

FIG. 8 illustrates left and right ends 50, 52 in greater detail. Each left and right ends 50, 52 are integrally formed to upper and lower spars 42, 44 at one side and are integrally formed to left and right mandrels 46, 48 at an opposite side. Left and right ends 50, 52 include outwardly projecting left and right cylindrical sidewalls 126, 128, respectively, left and right bosses 142, 144, and a bell mounting surface 148 and projection 150.

As illustrated on FIG. 10, upper and lower spars 42, 44 each have an upper and a lower centerline 71, 73. Upper spar centerline 71 is positioned forward of the lower spar centerline 73. Upper spar 42 further includes a rear margin 77. Rear margin 77 is positioned such that the rider positioned in a typical semi-upright riding position can view upper surface 104 of lower spar. A typical riding position is one where the rider's torso is positioned in an upright position or in a forward bent or forward leaning position where the rider's eyes are positioned rearward and above structure 16. Upper spar 42 is positioned further forward than lower spar 44 such that upper spar 42 will not occlude the rider's vision of display or displays positioned on lower spar 44. When the hands of the rider grip the upper spar 42, the head of the rider will be closer to the lower spar 44 than would otherwise occur in single-tube handlebar systems.

Structure 16 includes a center section disposed between left and right ends 50, 52, the center section has upper spar 42, the upper spar is spaced above lower spar 44, a steering coupler (stem 12 and/or extension 14, 15) formed on the lower spar 44 couples structure 16 to the steering axis of the vehicle. A steering coupler 133 is formed on lower spar 44 for coupling the handlebar to the steering axis of the vehicle.

Structure 16 has an elongate body having left and right ends 50, 52, each adaptable to receive a handgrip 210. The body having a general surface, and at least one receptacle formed to extend inwardly from the general surface of the body at a location between the left and right ends, the receptacle is adapted to receive a predetermined piece of equipment selected from the group consisting of controls, displays and accessories such that the piece of equipment will be substantially flush-mounted with respect to the general surface of the body.

Figure 33:
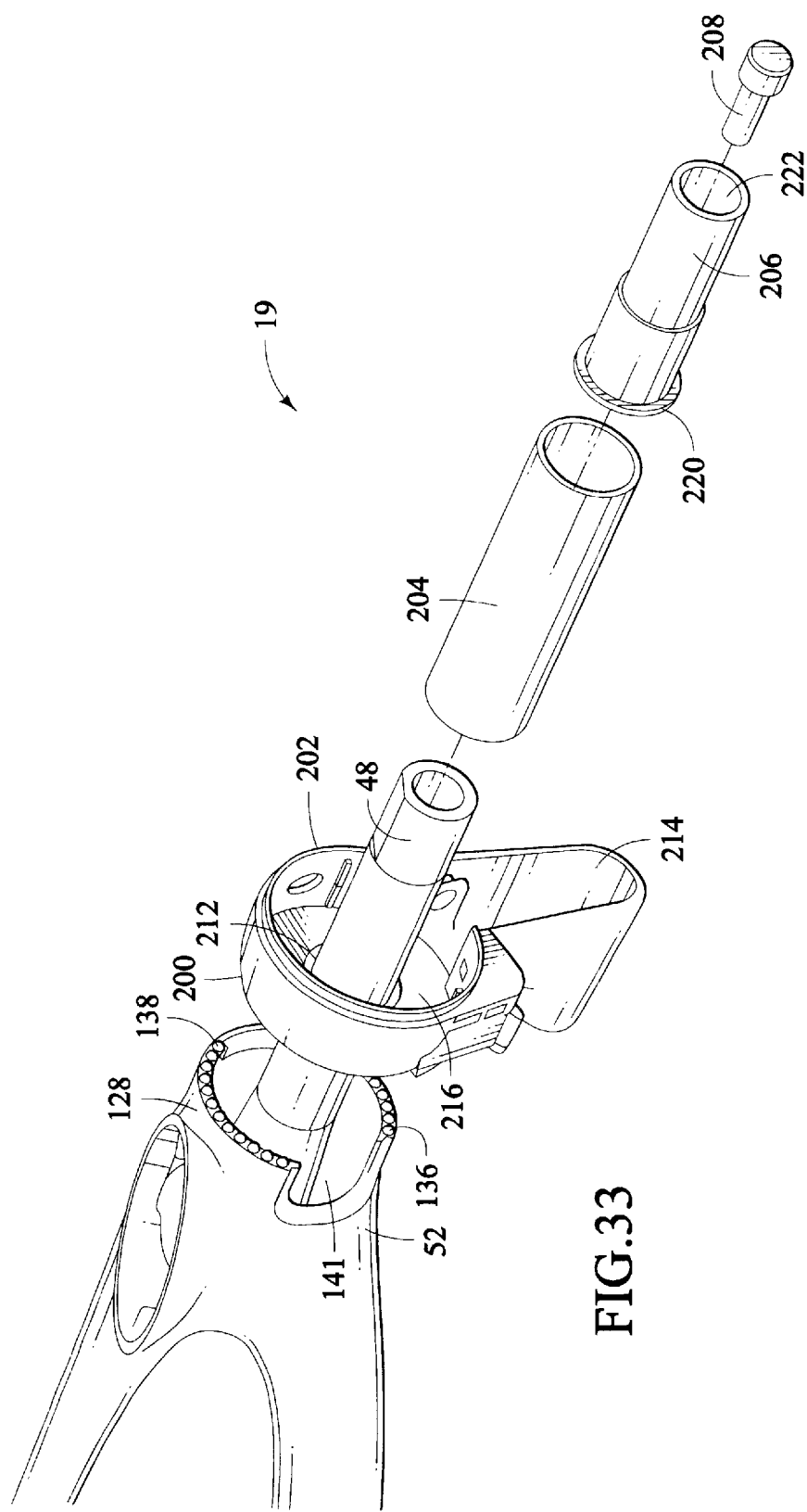
FIG. 33 is a rear exploded view of a control pod in accordance with an exemplary embodiment of the present invention.
Figure 36:
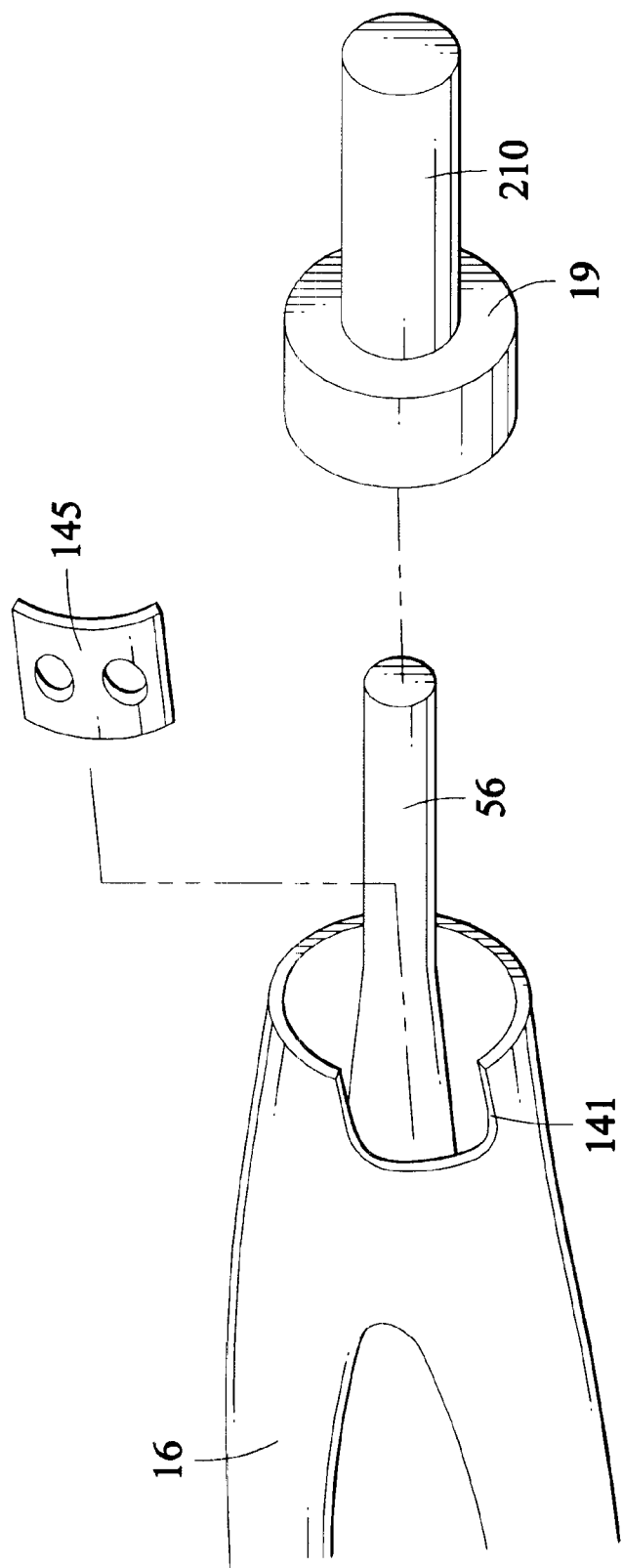
FIG. 36 is a rear exploded view of the right end of the integral support structure in accordance with an exemplary embodiment of the present invention.

Left and right cylindrical sidewalls 126, 128 extend along an axis substantially parallel to a longitudinal axis 130, 132 of left and right mandrels 46, 48, respectively. Members 126, 128 can be formed of non-annular shapes, such as rectangular, oval, irregular, etc. Left and right edges 134, 136 of left and right mandrels, respectively, include a plurality of outwardly and axially projecting detents 138 extending substantially around the perimeter of left and right edges 134, 136. As illustrated on FIG. 25, cylindrical sidewalls 126, 128 are configured to contact a mandrel attachment. Mandrel attachments can include brake shifters, gear shifters, actuator grips, integrated brake gear shifters, brake grip assemblies, gear shifter grip assemblies and hand grips. In an exemplary embodiment, detents 138 of at least one cylindrical sidewall 126, 128 engage at least one mandrel attachment to facilitate rotational positioning of the mandrel attachment about the mandrel. When left and right cylindrical sidewalls 126, 128 each engage one mandrel attachment, detents 138 facilitate the rotational positional positioning of the mandrel attachment with respect to one another. In an alternative exemplary embodiment, detents 138 project radially and outwardly from left and right cylindrical sidewalls 126, 128. Each cylindrical sidewall 126, 128, each mandrel 46, 48 and structure 16 define a receiving cavity 140. Receiving cavity 140 is configured to partially receive the mandrel attachment. In an alternative exemplary embodiment, receiving cavity 140 receives at least one supplemental device. In an exemplary embodiment as best shown in FIGS. 33 and 36, at least one cylindrical sidewall 126, 128 includes a rectangular cutout 141 inwardly extending from edge 134, 136. Cutout 141 can have an alternative shape, such as oval, square, circular, etc. As illustrated in FIG. 36, cutout 141 is configured to integrally receive at least one supplemental device, such as a pushbutton control 145. FIG. 36 illustrates the location of control 145 within cutout 141. Control pod 19 can be positioned at the right end 52 to cover right end 145 and the right edge of control 145. Cutout 141 proceeds inward from edge 136 of the one of the cylindrical sidewalls 126, 128 toward the longitudinal centerline of the handlebar steered vehicle.

Figure 25:
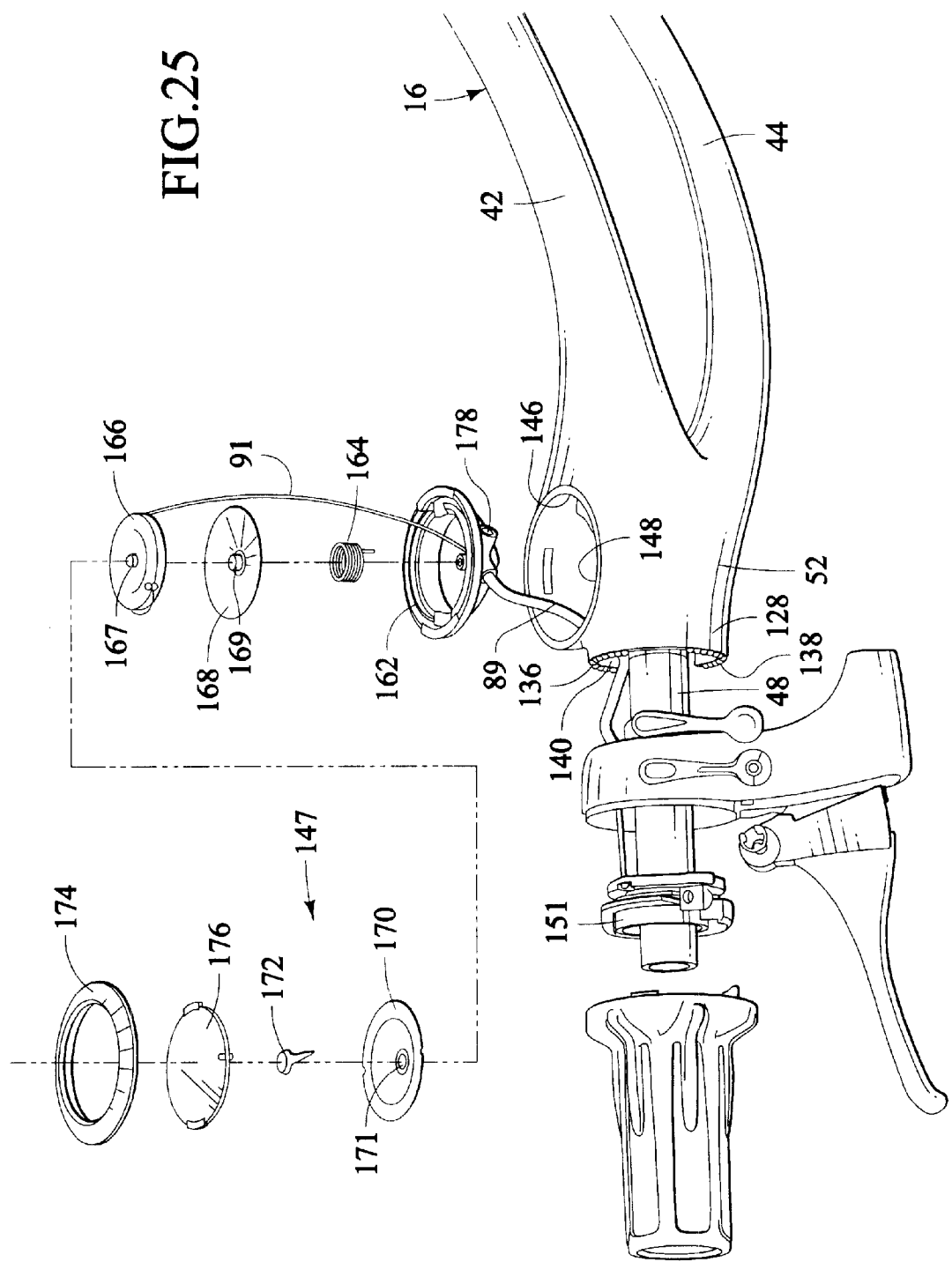
FIG. 25 is a front sectional exploded view of an integrated rider control system in accordance with an exemplary embodiment of the present invention.

As best shown in FIG. 8, left and right bosses 142, 144 integrally extend from left and right ends 50, 52, respectively. Each boss 142, 144 includes an indication port 146. In an exemplary embodiment, as shown in FIG. 25, indication port 146 is a gear indication port and an opening 148 extends through structure 16 connecting indication port 146 with receiving cavity 140. The opening allows for passage of at least one cable housing 89 and at least one cable, such as an auxiliary gear cable 91. In an exemplary embodiment auxiliary gear cable 91 extends through gear indication port to receiving cavity 140 to connect a gear shifter 151 to a gear indication device 147 within gear indication port 146.

The axis 147 of port 146 is angled rearwardly and inboard from the vertical. Port 146 is formed in the body to be offset from the longitudinal axis of the handlebar-steered vehicle. A left port 149 or first display receptacle, is adapted to receive a display to be viewed by the rider. The axis of left port 149 and a right port 155 are angled in an inboard and rearward direction with respect to a vertical reference. Right port 155 is a second display receptacle, and is positioned to the right of the longitudinal axis. Left port 149 is positioned to the left of the longitudinal axis.

As illustrated on FIG. 8, left mandrel 46 includes a bell mounting surface 148 and a bell mounting projection 150. Bell mounting surface and projection 148, 150 allow for the integrated attachment of a bell 152 to structure 16 as shown on FIG. 29. Alternatively, other equipment can also be integrally attached to surface and projection 148, 150. In an alternative exemplary embodiment, surface and projection 148, 150 are disposed on either of or both left and right ends 50, 52.

FIG. 8 illustrates left and right mandrels 46, 48 in greater detail. Left and right mandrels 46, 48 are cylindrical tubes. Left and right mandrels 46, 48 are integrally formed to and extend from left and right ends 50, 52, respectively along left and right mandrel axes 130, 132. In an exemplary embodiment, left and right mandrels 50, 52 include internally threaded open ends, 156, 158, respectively, configured to receive a fastener. In an exemplary embodiment, the outer diameter of the left and right mandrels 50, 52 is less than or equal to 0.875 inches. Left and right mandrels 50, 52 provide gripping surfaces for the user and are configured for the attachment of a mandrel attachment. Mandrel attachments can include brake shifters, gear shifters, actuator grips, integrated brake gear shifters, brake grip assemblies, gear shifter grip assemblies and hand grips. In alternative exemplary embodiments, left and right mandrels 46, 48 can have alternative forms, such as tapered spindle, solid cylindrical or non-cylindrical bars, etc. In an alternative exemplary embodiment, left and right mandrels 46, 48 are coupled to first and second ends 50, 52, respectively, of structure 16 and can be made a different material than structure 16, such as metal, aluminum, polymer, etc.

Figure 26:
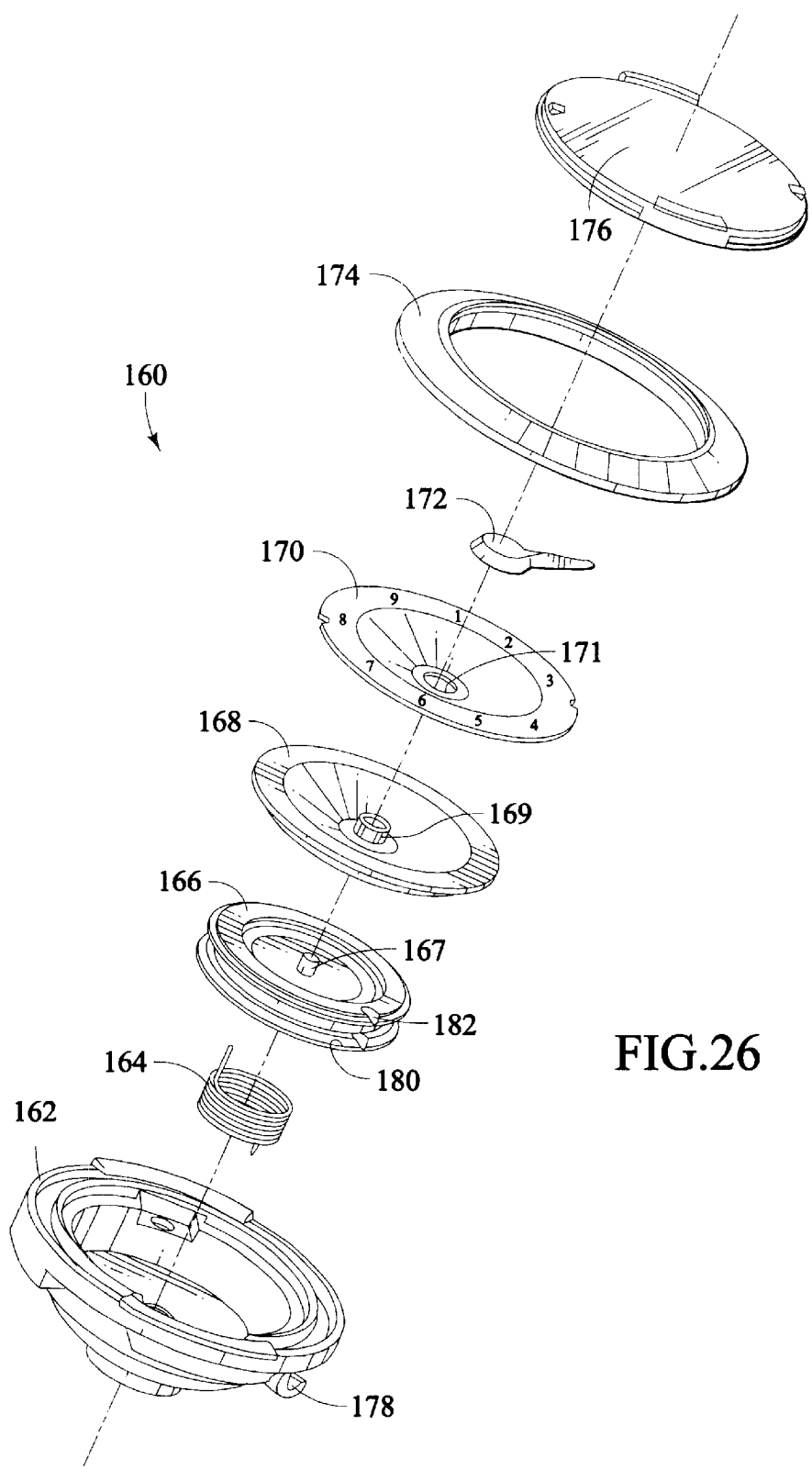
FIG. 26 is an exploded view of a dial gear indication device in accordance with an exemplary embodiment of the present invention.
Figure 27:
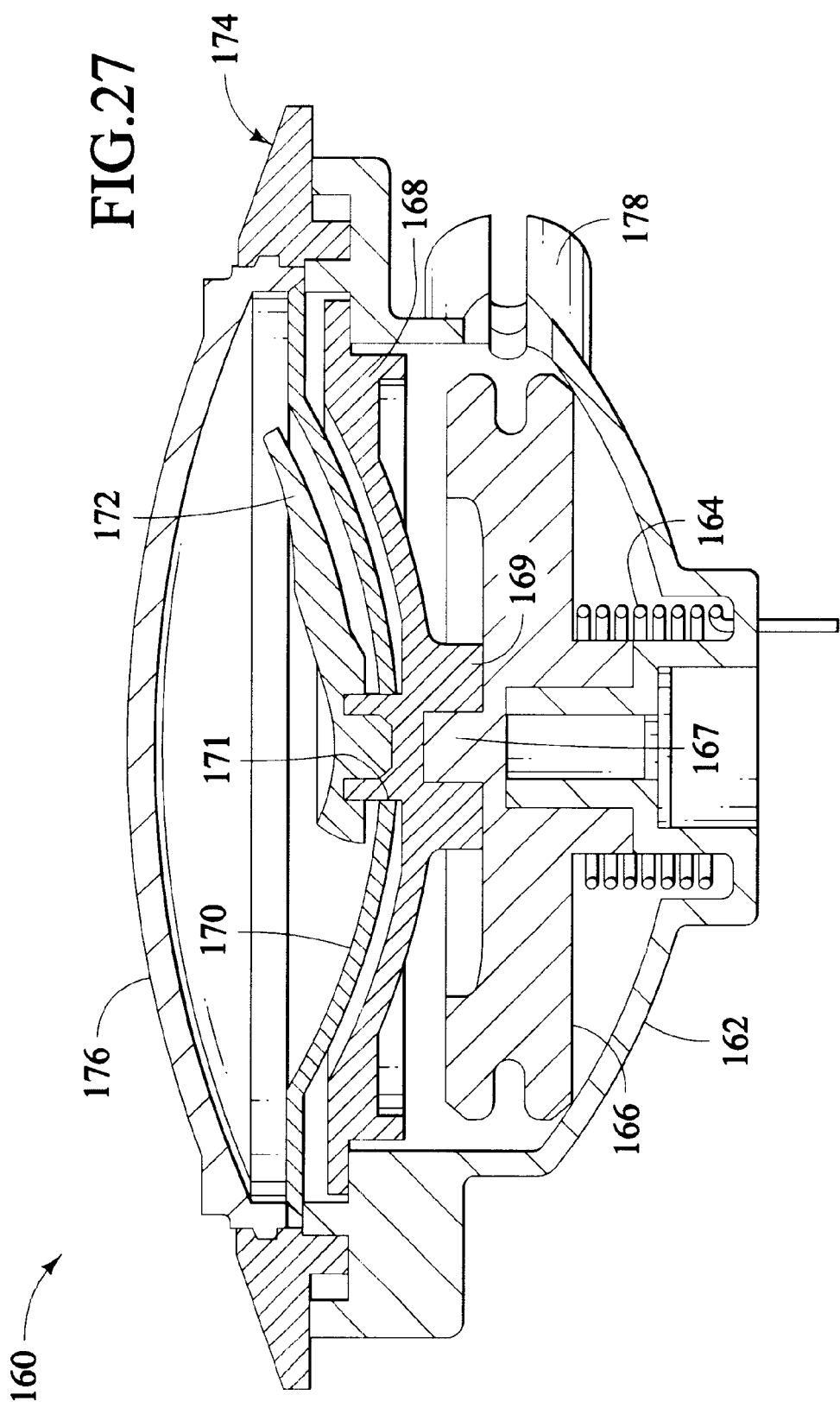
FIG. 27 is a cross-sectional view of the dial gear indication device of FIG. 26.

FIGS. 25 through 27 illustrate one exemplary embodiment of a gear indication device 147. Gear indication device 147 is a dial gear indicator 160. As shown in FIG. 25, dial gear indicator 160 is integrally disposed within at least one indication port 146 and is operably coupled to gear shifter 151 through an auxiliary gear cable 91. Dial gear indicator 160 displays positive indication of the existing position of the gear assembly to the rider. Dial gear indicator 160 positioned within the structure 16 to provide ergonomically optimal gear indication to the rider.

As best illustrated in FIG. 26, dial gear indicator 160 includes a bucket 162, a spring 164, a spool 166, an under-dial 168, a dial face 170, a needle 172, a lock ring 174, and a dome 176. Bucket 162 is a generally circular body having a radially extending gear cable passage 178. Bucket 162 is configured to hold the components of dial gear indicator 160. Spool 166 is a circular disk including an upstanding projection 167 upwardly extending from an upper surface of spool 166. Spool 166 has a gear cable slot 180. inwardly extending from the perimeter of spool 166 and a cable retention notch 182. Spool 166 rotatably connects to bucket 162. Spool 166 engages auxiliary gear cable 91 within dial gear indicator 160. Auxiliary gear cable 91 removable attaches to spool 166 at notch 182 and engages a portion of the perimeter of slot 180 of spool 166. Auxiliary gear cable 91 exits dial gear indicator 160 through passage 178 of bucket 162. Spring 164 is a biasing device connected to spool 166 at one end and bucket 162 at a second end. Spring biases spool 166 away from the upper surfaces of bucket 162 to facilitate rotational movement of spool 166. Under-dial 168 is a generally flat circular disk having a centrally positioned upwardly projecting hollow stub 169. Stub 169 is configured to engage the projection 167 of spool at a lower surface of under-dial 168. Under-dial 168 is configured for rotational movement with spool 166. Disk face 170 is a generally flat disk with a centrally positioned opening 171 and an upper surface with indicia representative of gear positions. Disk face 170 connects to an outer edge of bucket 162. Opening 171 is sized to allow stub 169 to extend through dial face 170. Needle 172 is a flat arrow shaped structure having a circular base. Needle 172 connects to stub 169 of under-dial 168. Needle 172 rotates along with spool 166 and under-dial 168. Lock ring 174 is a circular ring that secures to the outer edge of bucket 162. Dome 176 is a flat clear circular disk configured to removably attach to lock ring 174. Lock ring 174 and dome 176 retain gear dial indicator components in place. Dome 176 and lock ring 174 prevent moisture and debris from entering and interfering with the operation of dial gear indicator 160. Alternative dial gear configurations are contemplated, such as a dial gear configuration with a fixed dial and a rotating dial face.

Figure 28:
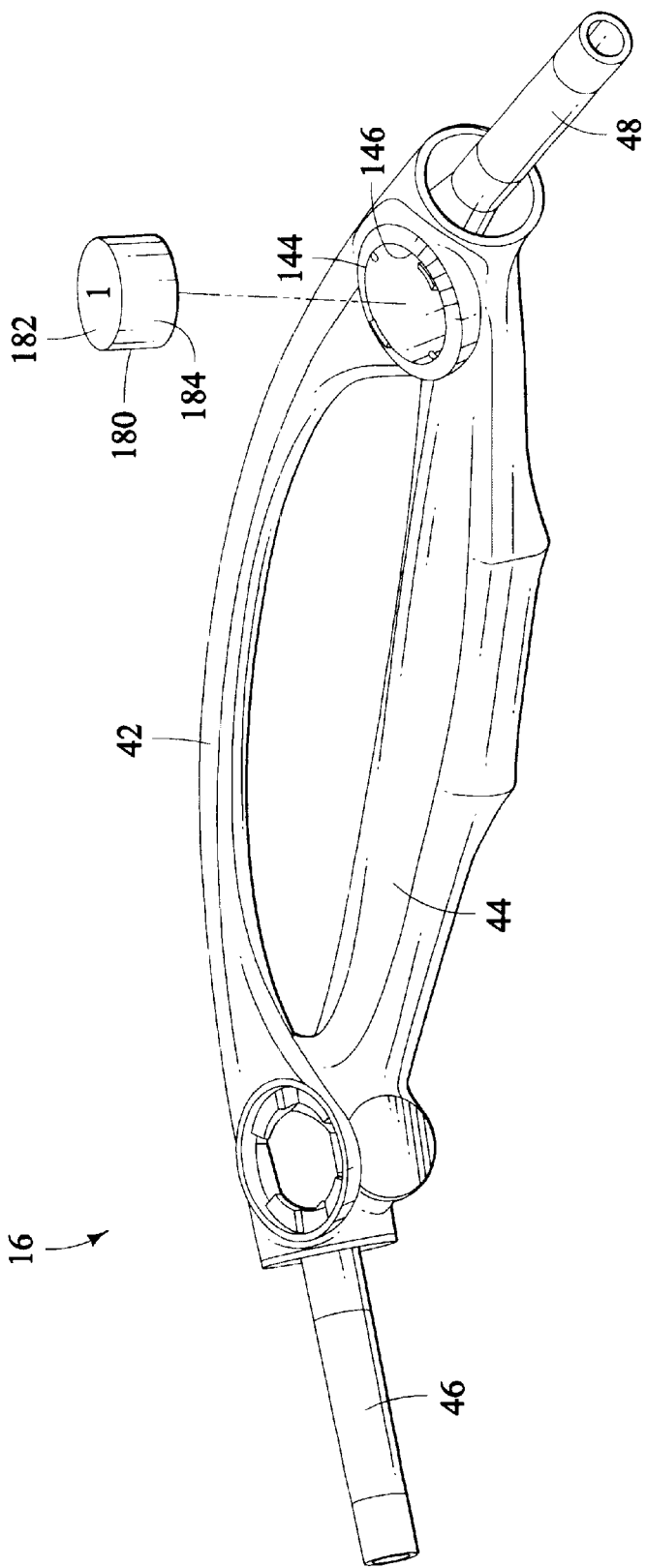
FIG. 28 is a rear perspective view of an integral support structure including an LED gear indication device.

FIG. 28 illustrates one exemplary embodiment of the gear indication device. The gear indication device is an LED gear indication device 180. LED gear indication device 180 is integrally connected to structure 16 at indication port 146. LED gear indication device 180 includes a display screen 182 and a body 184. Display screen 182 displays the gear setting of the vehicle.

FIGS. 29, 30 and 31A through I illustrate examples of the equipment available for integral connection to structure 16. The use of structure 16 eliminates the need to attach equipment in a random, piece-meal, add-on basis. The use of structure 16 minimizes or eliminates exposed sharp metallic surfaces of the equipment and the fasteners for the equipment. Structure 16 encloses substantially encloses cables 88 extending between the equipment, thereby minimizing or eliminating the risk of cable entanglement with foreign objects. Structure 16 provides significantly larger amount of mounting surfaces and receptacles than conventional handlebar assemblies minimizing obstructions to the rider and encroachment into the rider's space during operation of the vehicle. The integral attachment of equipment provided by structure 16 significantly reduces the susceptibility of such devices to theft. Equipment include accessories, controls and displays. Accessories include, but are not limited to, a bell 183, a computer 18, a light 184, a basket 185, a horn 186, a reflector 187, a heart rate monitor 188, a garage door opener 189, a compass 190, an odometer, a cyclometer, a drink holder 191, a mirror 192, a radio holder 193, an alarm, a cell phone holder 194, a beeper holder 195, a lock holder 196, a global positioning system 197, an ash tray 198, a tool pack 199, keyring holder 201 and a combination thereof. Controls include, but are not limited to, levers, pushbuttons, switches, actuators, brake shifters, gear shifters, actuator grips, integrated brake gear shifters, brake grip assemblies, computers and gear shifter grip assemblies. Displays can include LED display devices, computer monitors, etc.

In an alternative exemplary embodiment, integral support structure is an elongate single spar structure. The single spar structure includes a plurality of mounting surfaces and receptacles configured to integrally attach and receive the equipment.

III. Handlebar Assembly Having a Cushiionable Cover

FIGS. 13 through 16 illustrate a handlebar assembly for a handlebar steered vehicle, shown as integral support structure 16, having cushionable cover 86. Cushionable cover 86 is a flexible, elongate sheet of resilient, tactile material. Cover 86 connects to structure 18. In an exemplary embodiment, cover 86 can substantially cover channel 78. Cover 86 includes a lower surface having a plurality of downwardly projecting bosses 92. Each boss 92 having an longitudinal bore. Bosses 92 are configured to engage pins 82 and provide a removable friction fit of cover 86 to structure 16. In an alternative exemplary embodiment, cover 86 has a generally flat lower surface configured to attach to a generally flat surface of the handlebar assembly. Cover 86 facilitates the integral attachment of fasteners and cables 88 within structure 16. Cover 86 can be used to shield the rider of the vehicle from sharp metal surfaces and hardware of fasteners and prevent cables 88 from dangling beyond structure 16 and becoming entangled with foreign objects. Cover 86 can be used to prevent moisture from entering openings and recesses positioned beneath cover 86. Cover 86 provides a smooth, tactile upper surface and an aesthetically pleasing appearance to structure 16. Cover 86 is made of an elastomeric, resilient material such as rubber. Cover 86 can also be made of alternate materials, such as plastic, etc. Cover 86 can be made in a variety of different colors to match the color scheme of the vehicle or other object. In an alternative embodiment, cushionable cover 86 can be made in a variety of different shapes and sizes to match any handlebar assembly or rider control device for handlebar steered vehicles:

IV. An Integrated Mandrel Mounted Actuation Device (Control Pod) for Bicycles

Figure 34:
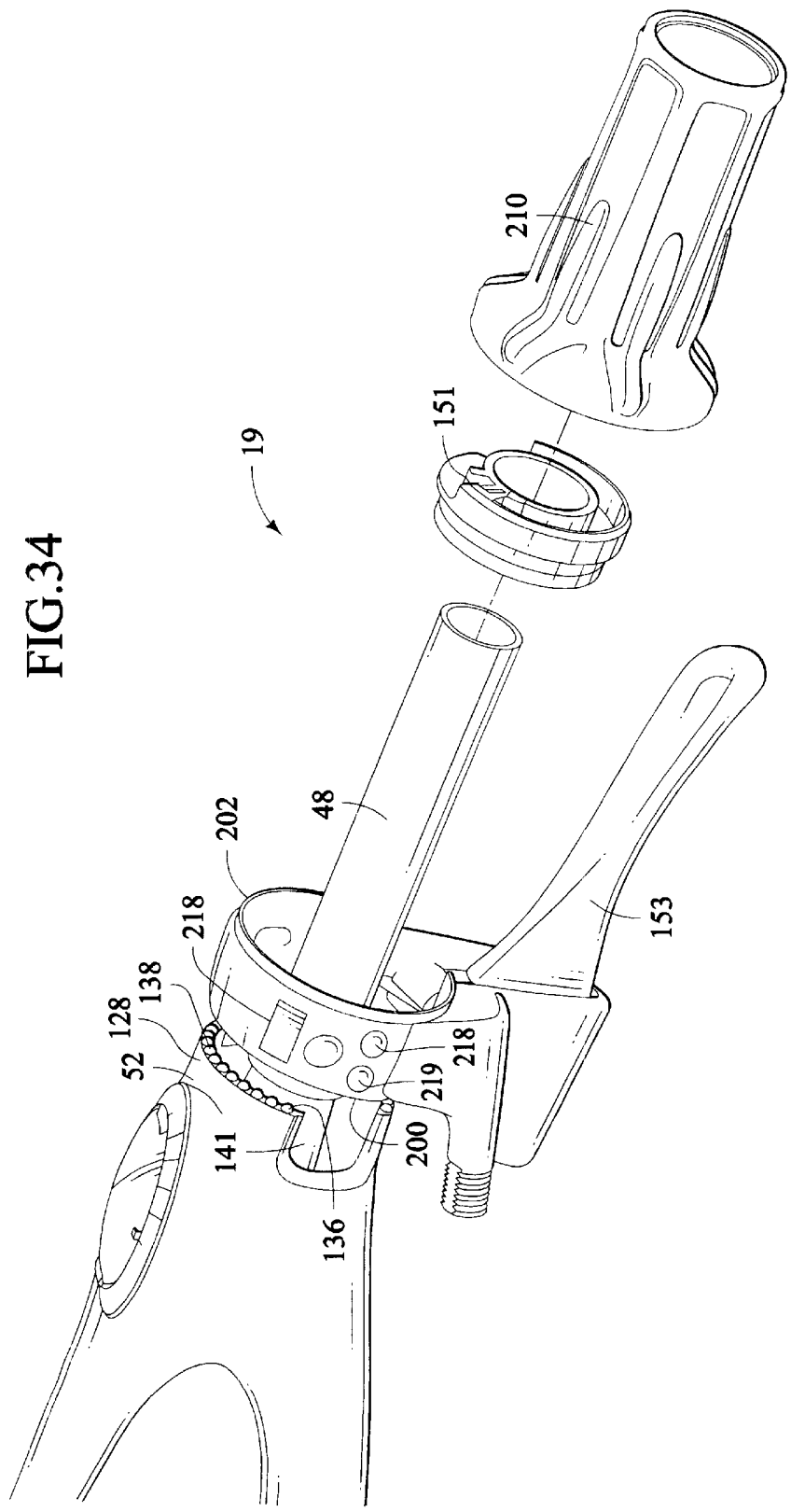
FIG. 34 is a rear partially exploded view of the control pod of FIG. 33.

FIGS. 2 through 4 illustrate an integrated mandrel, or hand grip mount, mounted actuation device, shown as control pod 19. FIGS. 33 and 34, illustrate control pod 19 in greater detail. Control pod 19 is configured to axially connect to mandrel 46, 48, or a grip mount, of a handlebar assembly or a rider control device, shown as integral support structure 16. Control pod 19 includes a positioning surface 200 configured to extend in a plane that is substantially perpendicular to longitudinal axis of mandrel 46, 48. Positioning surface 200 of pod 19 is configured to contact the left or right ends 50, 52 of structure 16 when pod 19 is installed over left or right mandrel 46, 48. In an alternative exemplary embodiment, positioning surface 200 is configured to contact a stop attached to the handlebar assembly or the rider control device. Control pod 19 integrates the handgrip, actuation devices, and controls into an assembly configured to quickly and easily attach to mandrel 46, 48 of structure 16. In particular, control pod 19 integrates controls and actuators in a position within reach of the rider's hand without requiring the rider to remove his hand from structure 16 in order to actuate the controls or the actuators.

In an exemplary embodiment, as illustrated in FIG. 33, control pod 19 includes a pod housing 202, an intermediate tube 204, an axial fixture 206, actuating devices, and a fastener 208. Pod housing 202 is configured to slidably and axially mount to left. or right mandrel 46, 48, or grip mount. Pod housing 202 is a housing having a mandrel opening 212, a brake lever region 214, and a gear shifter region 216. Mandrel opening 212 is a generally circular opening configured to allow mandrel 46, 48 to extend therethrough. Gear shifter region 216 is an upper region of pod housing 202 shaped to substantially enclose and conform to gear shifter 151. Brake lever region 214 is a lower region of pod housing 202 shaped to partially enclose brake lever 153. As shown in FIG. 34, pod housing 202 further includes control openings 218 are configured to accommodate controls. Pod housing encompasses and protects gear shifter 151, brake lever 153 and the controls from contact with foreign objects. Pod housing 202 is made of a plastic material. Alternative pod housing materials can be used such as nylon, aluminum, etc.

Referring to FIG. 33, intermediate tube 204 is a spacer tube configured to slidably extend over mandrel 46, 48 and to contact housing 202 at one end. Axial fixture 206 is a tube having a flanged end 220 and a fastener end 222. Fixture 206 is configured to extend over mandrel 46, 48 and contact intermediate tube 204 at flanged end 220. Fastener 208 extends through fastener end 222 of fixture 206 and engages threaded inner surface of mandrel 46, 48. As fastener 208 fastens to mandrel 46, 48, fastener 208 transmits force to fixture 206. Flanged end 220 of fixture 206 transmits the force to intermediate tube 204. Intermediate spacer 204 transmits the force to pod housing 202 causing pod housing to contact structure 16, or alternatively, the stop of the handlebar assembly. Fastener 208 secures pod housing 202, intermediate tube 204 and fixture 206 to one of left and right mandrels 46, 48.

As illustrated in FIG. 34, actuating devices, such as gear shifter 151 and brake lever 153, are attached to housing 202. Control devices 219 can also be inserted within housing 202 at control openings 218 of housing 202. A handgrip 210 is configured to slidably and removably fit over fixture 206 and contact outside edge of pod housing 202. In an exemplary embodiment, as illustrated in FIGS. 2 through 4, structure 16, housing 202 and grip 210 form a substantially continuous outer surface outline. In an alternative exemplary embodiment, control pod 19 is integrally and removably installed to left or right mandrels 46, 48 as a complete assembly. Control pod 19 can be adapted to contain a variety of different combinations of controls.

In an exemplary embodiment as illustrated in FIG. 34, ends 50, 52 include cylindrical sidewalls 126, 128 extending along an axis substantially parallel to a longitudinal axis 130, 132 of mandrels 46, 48, respectively. Edges 134, 136 of cylindrical sidewalls 126, 128, respectively, include a plurality of outwardly and axially projecting detents 138 extending substantially around the perimeter of edges 134, 136. Cylindrical sidewalls 126, 128 are configured to contact positioning end 200 of pod housing 202. In an exemplary embodiment, detents 138 of at least one cylindrical sidewall 126, 128 engage positioning end 200 of pod housing 202 to facilitate rotational positioning of control pod 19 about the mandrel. When left and right cylindrical sidewalls 126, 128 each engage one positioning end 200 of one pod housing 202, detents 138 facilitate the discrete rotational positioning of the control pods 19 with respect to one another. Detents 138 of left and right cylindrical sidewalls 126, 128 allow for the user to quickly and easily adjust and align control pods 19 positioned on left and right ends 50, 52 of the handlebar assembly or the integral rider control device. The integration and ergonomic positioning of controls and actuators with gripping surfaces of control pod 19 increases the rider's ability to control the vehicle.

V. A Control Assembly for a Bicycle Handlebar Assembly

Figure 35:
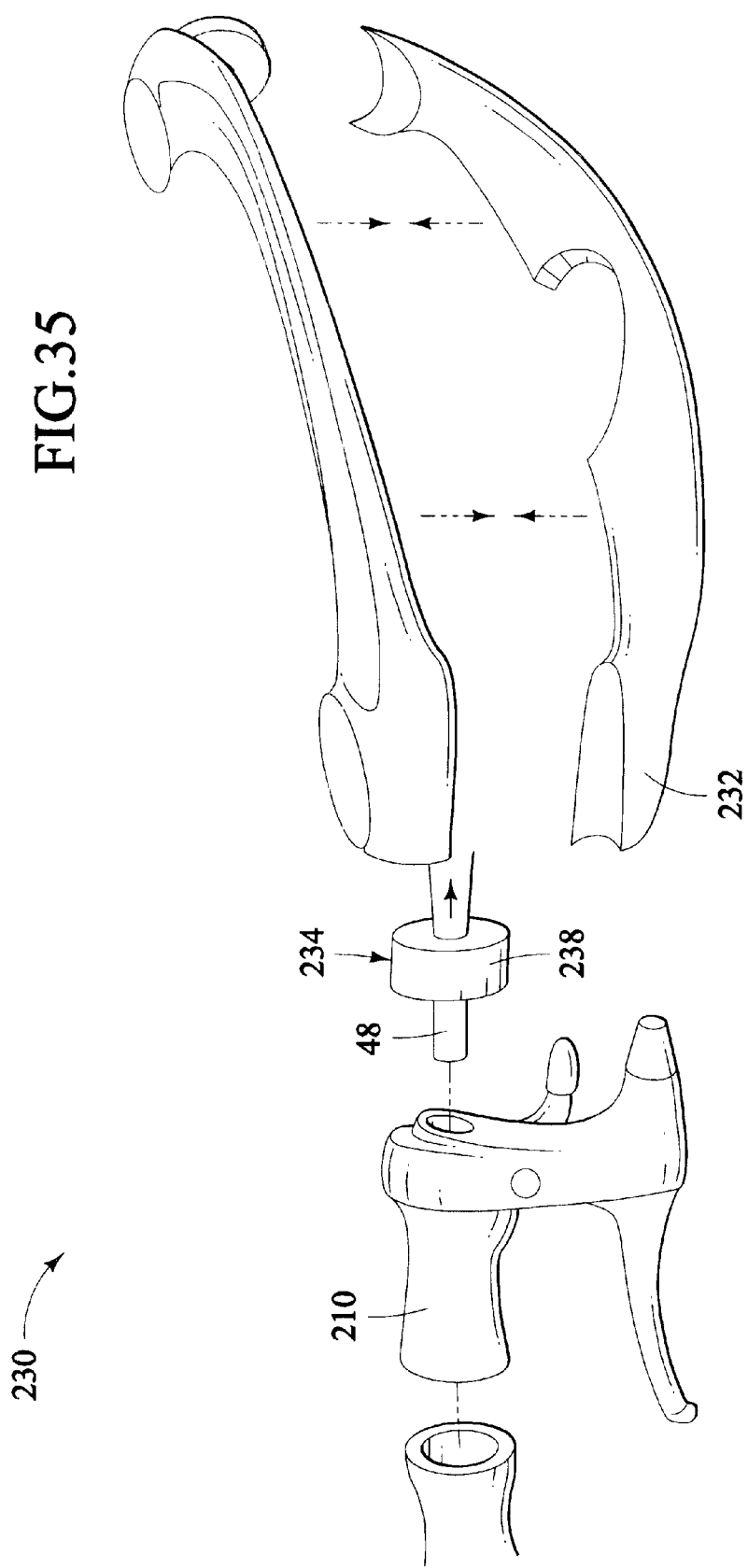
FIG. 35 is a front perspective view of a bicycle control assembly in accordance with an exemplary embodiment of the present invention.

FIG. 35 illustrates a control assembly 230. Control assembly 230 includes a stop 232, a control ring 234, and a handgrip assembly 236. Stop 232 is a projection or boss integrally formed to or attached to a handlebar assembly or a rider control device. Either of the handlebar assembly and the rider control device are positioned at the forward end of the bicycle, are pivotally coupled to bicycle about a steering axis of the bicycle, and include left and right mandrels 46, 48, or left and right grip mounts, transersely extending from the longitudinal axis of the bicycle. Stop 232 is configured to prevent movement of control ring 234 further up or along the handlebar assembly or the rider control device past stop 232.

Control ring 234 is a device having a generally circular shape integrating equipment such as bicycle controls, accessories, displays, or any combination thereof. Control ring 234 can be configured in alternative shapes, such as rectangular, irregular, etc. Control ring 234 is configured to couple to the handlebar assembly or the rider control device. In an exemplary embodiment, control ring 234 slidably and axially mounts to left or right mandrel 46, 48 of handlebar assembly or rider control device and is positioned adjacent to stop 232. In alternative exemplary embodiment, the control ring includes a hinge or a slot allowing for non-axial attachment of the control ring to the handlebar assembly or the rider control device. In another alternative embodiment, the control ring is comprised of at least two pieces that are fastened together about the handlebar assembly or the rider control device. Control ring 234 includes a housing 238 and at least one control, accessory, or display device. Handgrip 210 is axially and slidably attached to left or right mandrel 46, 48 and is positioned adjacent to control device 234 at a side of control device 234 opposite of stop 232. Handgrip 210 prevents the movement of control device 234 along or down left or right mandrel 46, 48 or the grip mount. In an exemplary embodiment, handgrip 210 is an integrated brake shifter. Alternative handgrip configurations are contemplated. In an alternative embodiment, control ring 234 is coupled to a rider control device having a "clam shell" structure. The mandrel or grip mount is removably inserted into one or both of the control ring and the rider control device.

VI. A Rider Control System for a Bicycle Having an Extended Range of Adjustment

Figure 37:
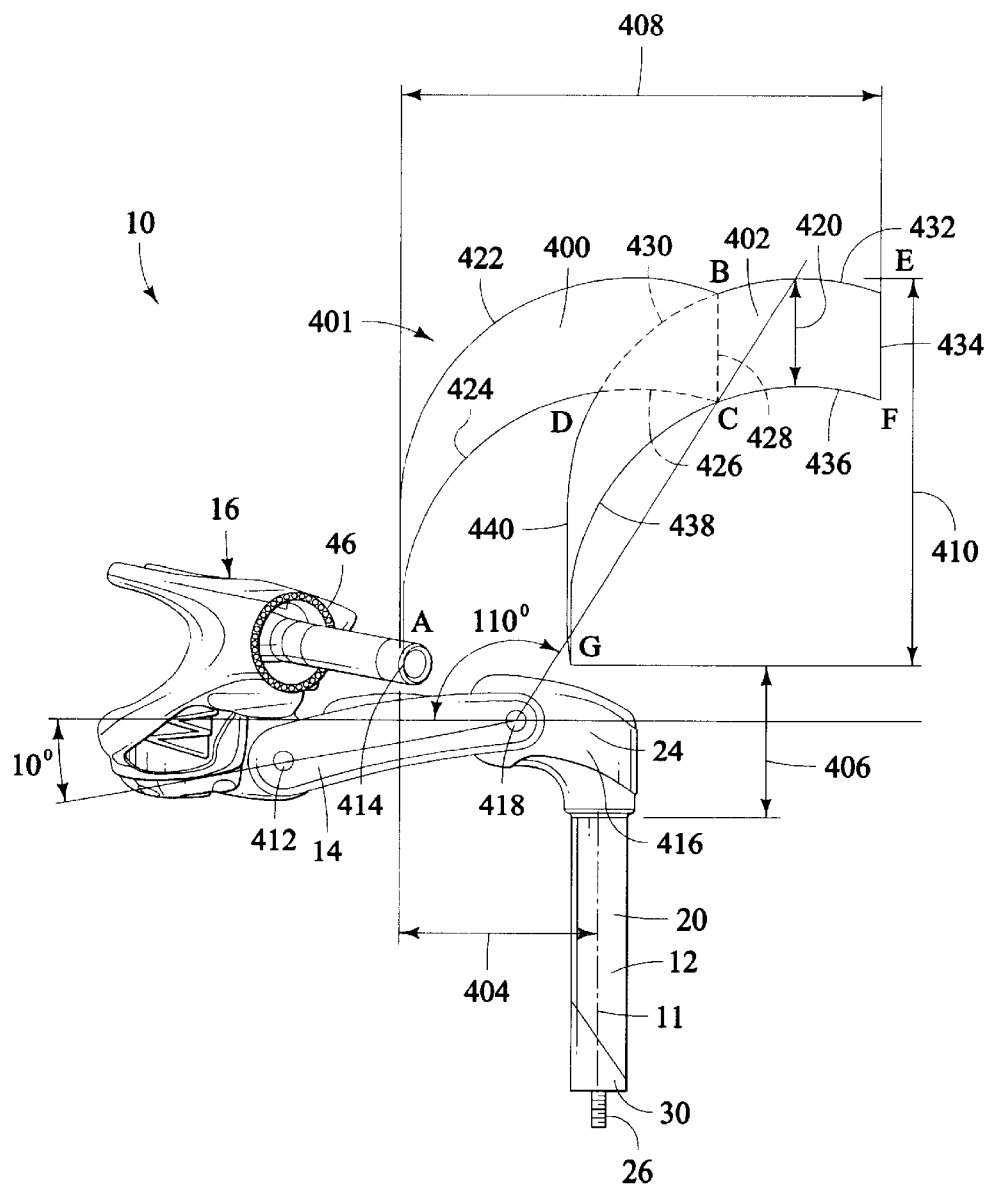
FIG. 37 is a side perspective view of an integrated rider control system in accordance with an exemplary embodiment of the present invention illustrating the operating adjustable range of the system.

FIG. 37 illustrates the range of adjustability of integrated rider control system 10. Stem 12 is an elongate member having a distal end or head 24 projecting forward toward integral support structure 16. When the front wheel of the bicycle is straight, structure 16 is transversely positioned with respect to the longitudinal axis of the bicycle. Left and right extensions 14, 15 (only 14 is shown) pivot about a transversely extending stem extension axis 418 and a transversely extending support structure/extension axis 412. In an exemplary embodiment a lower surface of structure 16 is positionable about stem extension axis 418 from a negative 10 degrees to a positive 110 degrees with respect to a horizontal plane extending through the stem extension axis 418. Horizontal reference range 404 is the range of possible horizontal distances between steering axis 11 (the centerline of quill 20) to forward end point 414 of left mandrel 46 of structure 16. This distance and the other distances mentioned herein are measured by orthogonally projecting one of the ends of the support structure onto a plane including the longitudinal and steering axes of the bicycle, and taking a measurement to that projection. Alternatively, this stem axis could be orthogonally projected onto a measurement point resident in a plane containing the end 414, which plane is parallel to this steering axis 11 and the longitudinal axis of the bicycle. In an exemplary embodiment, horizontal reference range 404 extends from 0 to 185 mm. In one particular exemplary embodiment, horizontal reference range is approximately 89 mm. Vertical reference line 406 is the distance from the bottom of stem head 416 to forward end point 414.

Stem head 416 is connected at quill 20 at distal end 24 of stem 12. Stem vertical adjustment range 420 defines the extent to which stem 12 can upwardly and axially extend from the handlebar controlled vehicle. In an exemplary embodiment, stem vertical adjustment range 420 is in the range of 0 to 100 mm. In one particular exemplary embodiment, stem vertical adjustment range is approximately 50 mm.

Figure 38:
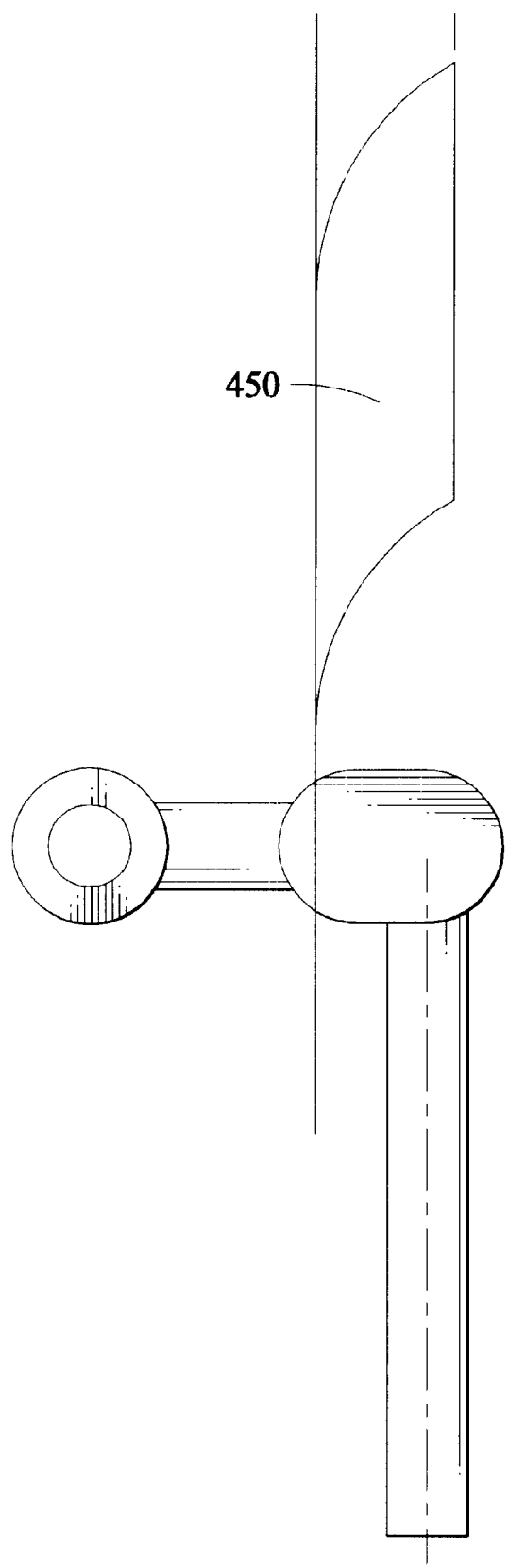
FIG. 38 is side perspective view of a prior art bicycle handlebar assembly having a 90 millimeter stem extension.
Figure 39:
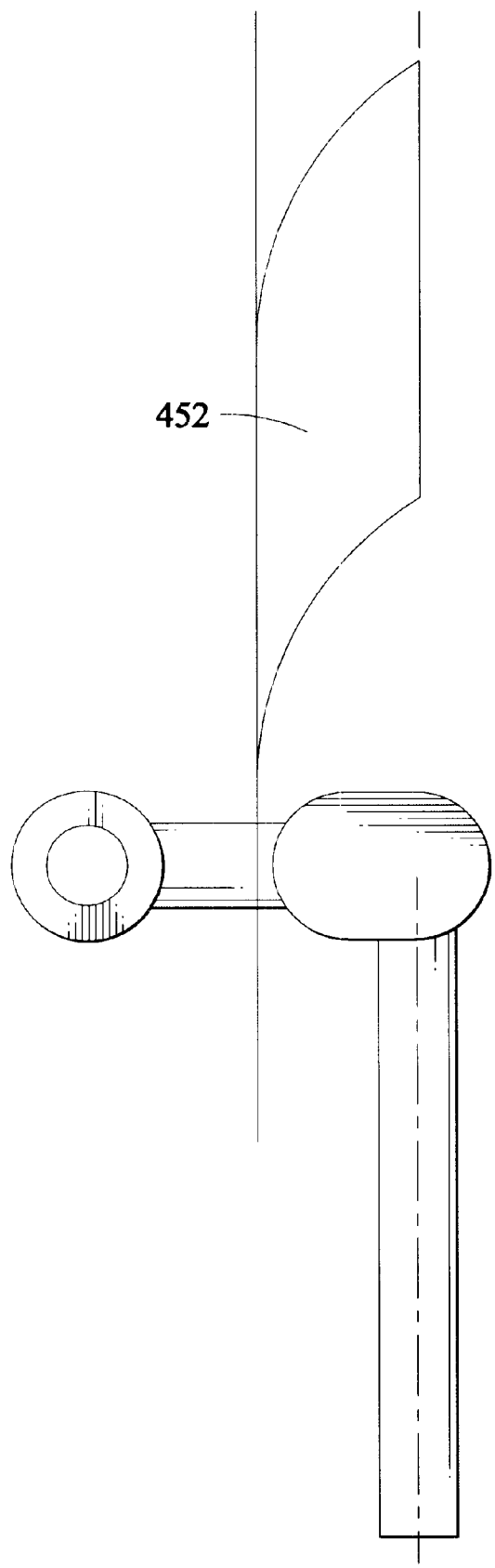
FIG. 39 is side perspective view of a prior art bicycle handlebar assembly having a 105 millimeter stem extension.
Figure 40:
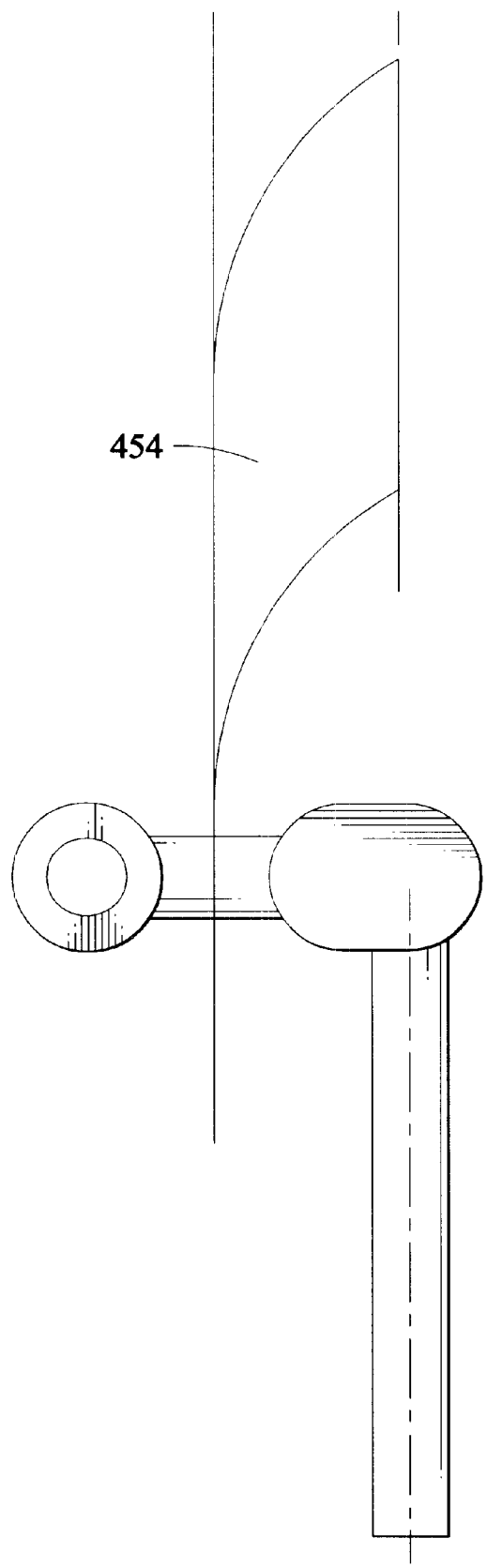
FIG. 40 is side perspective view of a prior art bicycle handlebar assembly having a 120 millimeter stem extension.

A forward stem envelope 400 is an area defined by three arcs 422, 424 and 426 and one line 428 connecting points A, B, C and D. Forward stem envelope 400 illustrates the range of positions available to the rider for the location of forward end point 414 of structure 16 when distal end 24 of stem 12 is a forwardly projecting position. The rotation of extensions 14, 15 and structure 16 about stem extension axis 412 and structure extension axis 418, and vertical stem adjustment range 420 of system 10, allows the rider to adjust and secure forward end point 414 within any point defined by the forward stem envelope 400. A rearward stem envelope 402 is an area defined by five arcs 430, 432, 436, 438 and 440 and one line 434 connecting points G, D, B, E, F and C. Rearward stem envelope 402 illustrates the range of positions. available to the rider for the location forward end point 414 of structure 16 when distal end 24 of stem 12 is in a rearwardly projecting position (as shown in FIG. 7B). The forward and rearward positioning of stem 12 (flip-flop positioning) in combination with horizontal reference range 404, vertical stem adjustment range 420 and the 120 degree range of pivot defines a total available reach 408, and a total available height 410 of system 10. In an exemplary embodiment, total available reach falls within the range of 0 to 314 mm and total available height falls within the range of 0 to 245 mm. In one particular exemplary embodiment, total available reach is approximately 218 mm and total available height adjustment is approximately 175 mm. The prior art handle bar assembly configurations illustrated in FIGS. 38 through 40 provide a range of total available reach from 44.72 mm to 59.86 mm and a range of total available height from 212.85 mm to 243.76 mm. The area of adjustability envelopes 450, 452 and 454 of shown on FIGS. 38 through 40, respectively, are significantly smaller than the total range of adjustability of structure 16 defined by forward and rearward envelopes 400 and 402. The increased range of adjustability allows system 10 to ergonomically adapt to a wider range of riders and riders' needs. System 10 provides the rider with greater adjustment flexibility. The increased range of adjustability of system 10 allows system 10 to quickly and easily adapt to the needs of each rider.

Forward and rearward stem envelopes 400 and 402 collectively define a two dimensional geometric shape 401 in the plane of the longitudinal axis of the bicycle. Two dimensional geometric shape 401 defines the adjustable operating range of the rider control device with respect to the steering axis of the handlebar-steered vehicle. Shape 401 has a non-zero area, unlike many prior art handlebars which can be adjusted through an arc. Arcs 402, 424, 438, 440 432, 426, and 436 can also be represented as part of a polygonal shape. Shape 401 has a non-zero height and a non-zero reach, in which the maximum height adjustment is at least 245 millimeters and the reach adjustment is at least 314 millimeters.

VII. A Bicycle Safety System for a Bicycle Including a Garage Door Opener

Figure 29:
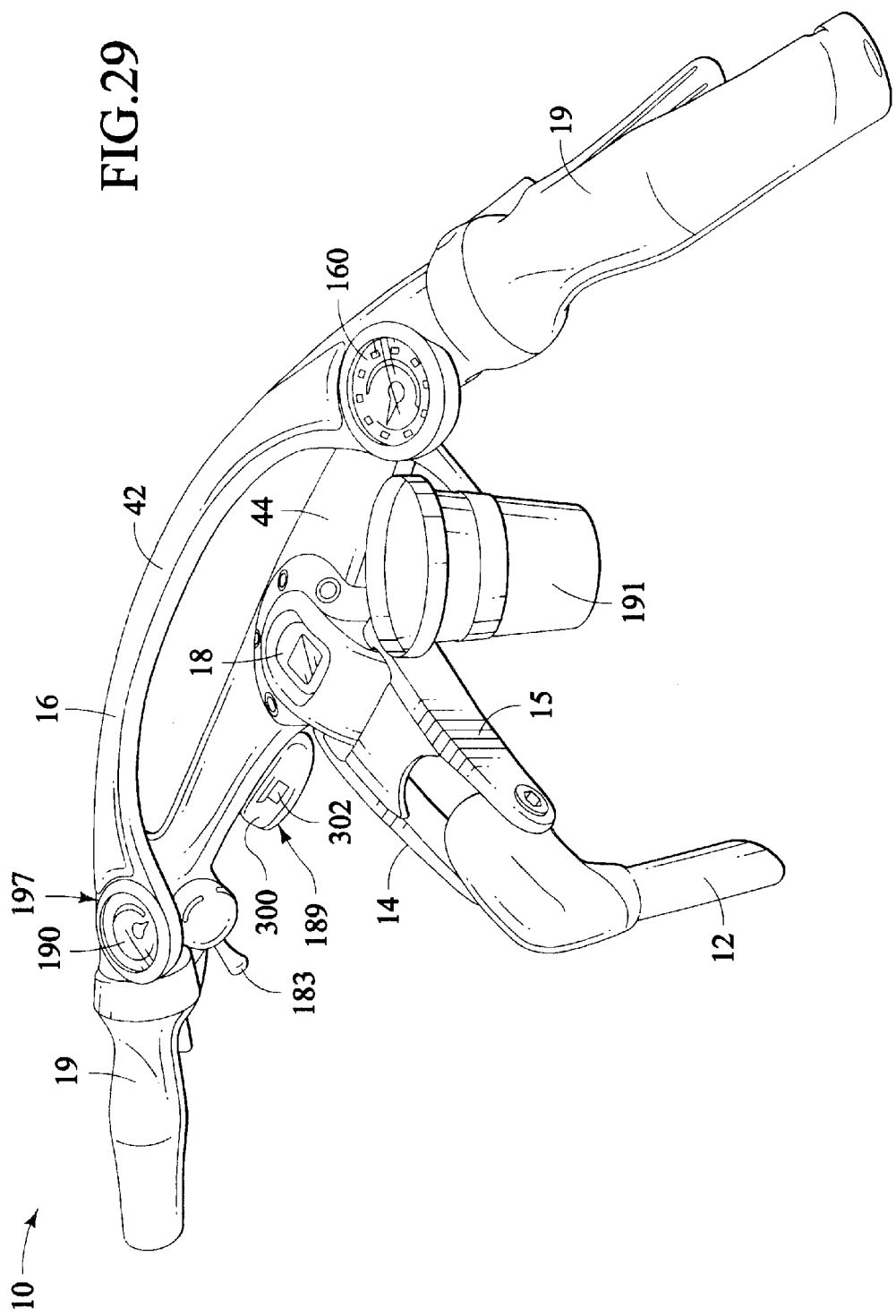
FIG. 29 is a front perspective view of an integrated rider control system in accordance with an exemplary embodiment of the present invention.
Figure 30:
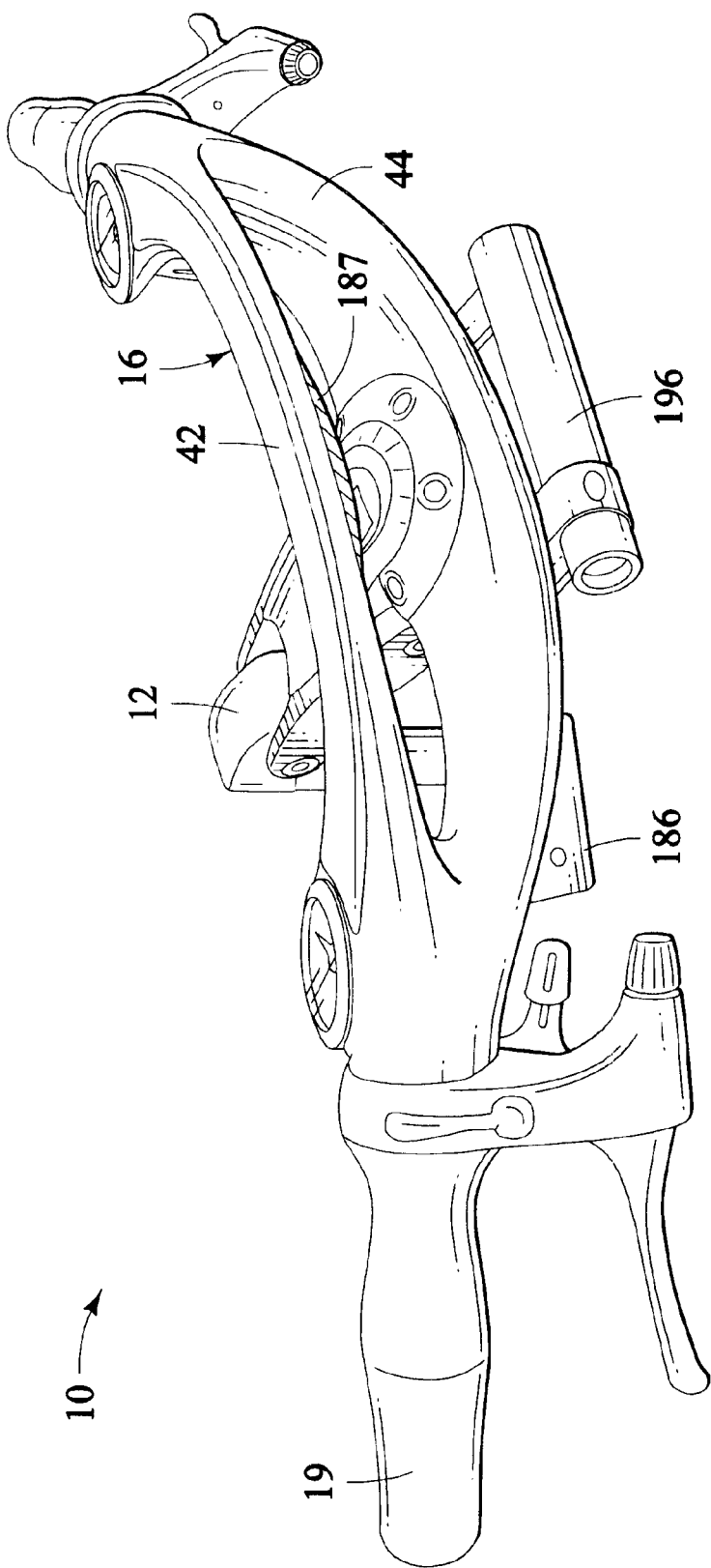
FIG. 30 is a front perspective view of an integrated rider control system in accordance with an exemplary embodiment of the present invention.
Figure 31C:
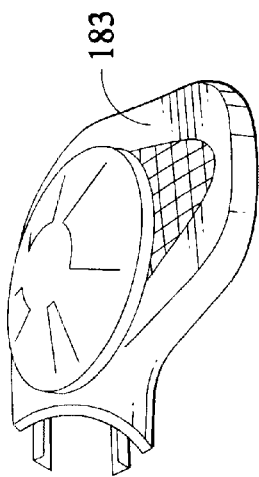
FIGS. 31A through 31I are front perspective views of accessories in accordance with an exemplary embodiment of the present invention.
Figure 31B:
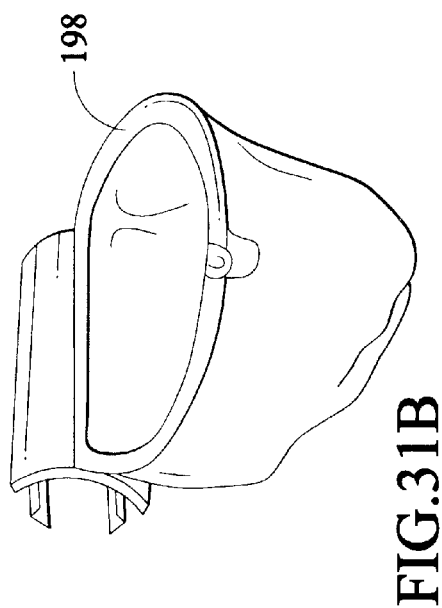
Figure 31A:
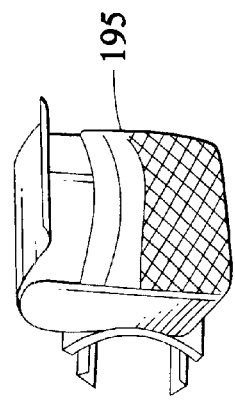
Figure 31F:
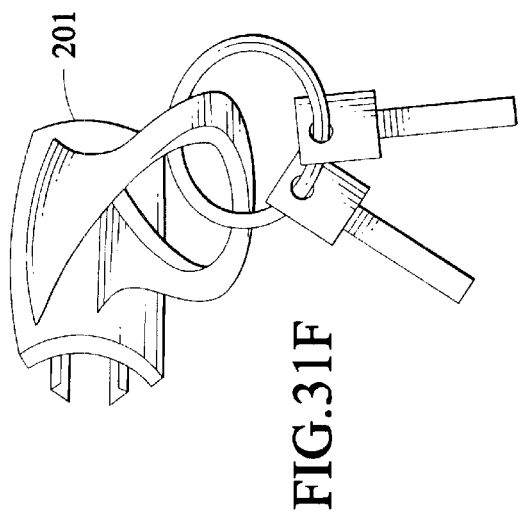
Figure 31E:
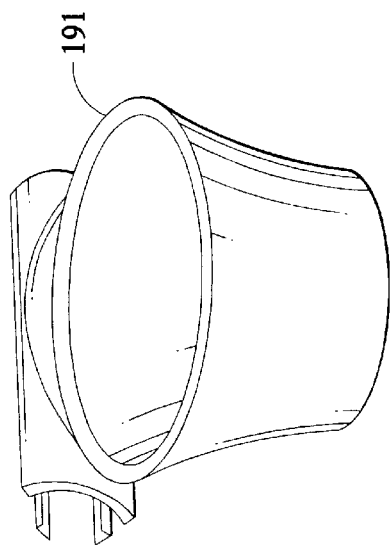
Figure 31D:
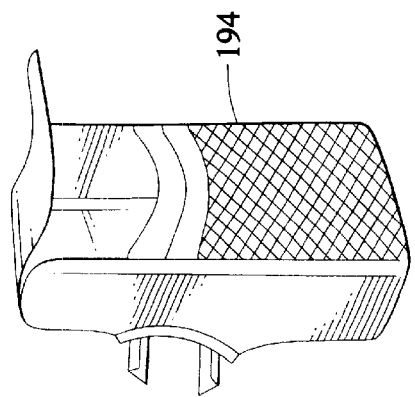
Figure 31I:
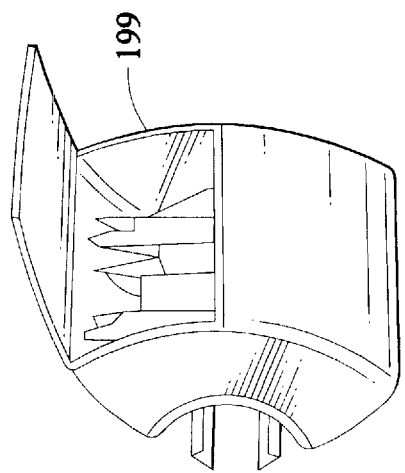
Figure 31H:
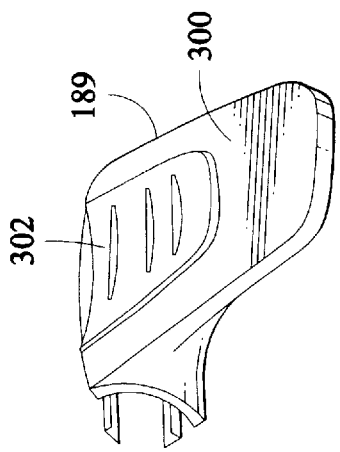
Figure 31G:
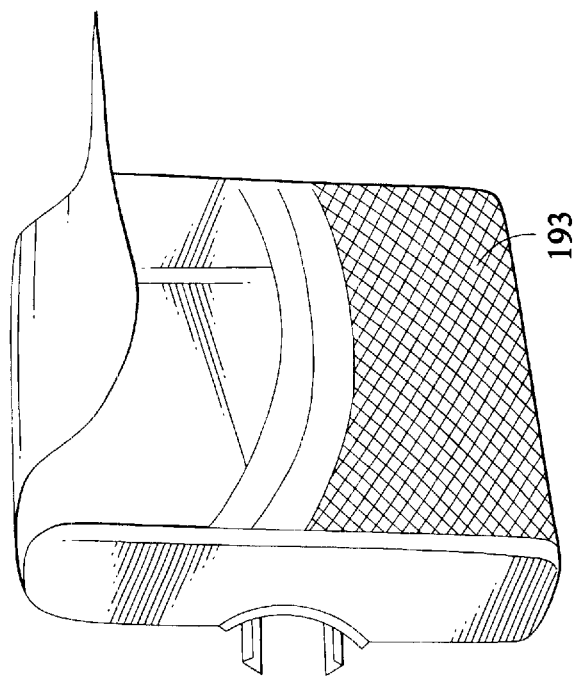
Figure 32:
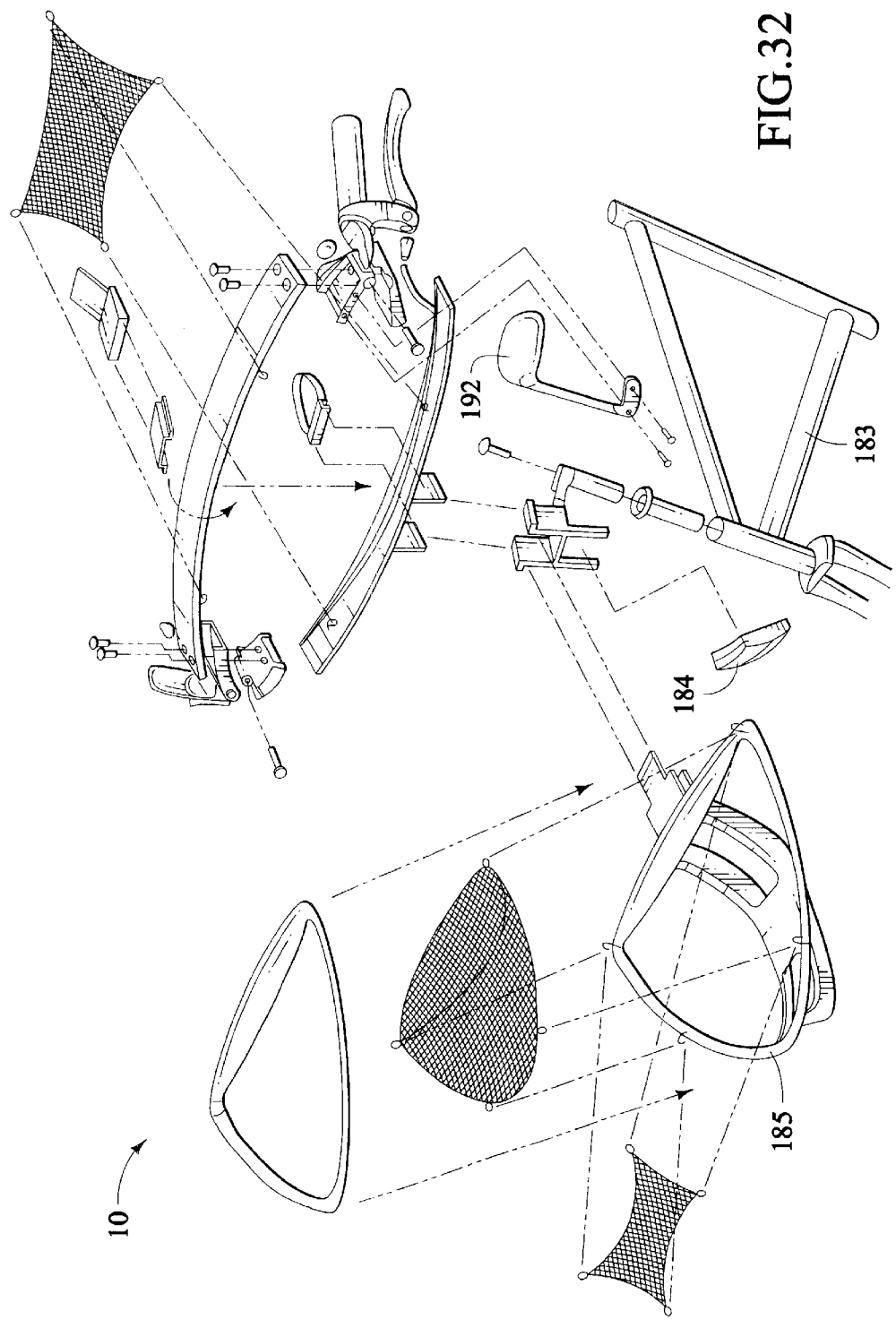
FIG. 32 is an exploded perspective view of an integrated rider control system illustrating a plurality of accessories in accordance with an exemplary embodiment of the present invention.

FIGS. 29 and 31H illustrate a remote garage door opener 189 attached to a rider control system or handlebar assembly. Garage door opener is a remote control device of conventional design including a body 300, a pushbutton 302 and a control circuit. Body 300 substantially encloses the control circuit and includes and an opening for pushbutton 302. Body 300 is configured to be removably and integrally coupled to the rider control system or the handlebar assembly. Body 300 can be configured in a variety of shapes, sizes and colors. Pushbutton 302 is coupled to body 300 at the pushbutton opening of body 300 and to the control circuit. Garage door opener control circuits are well known. Any of these well known circuits can be included into the structure of remote garage door opener 189.

Remote garage door opener 189 allows the rider to gain quick, easy, safe and efficient ingress into a garage or storage area. Remote garage door opener 189 connected to the rider control system or the handlebar assembly of a bicycle allows the rider to remain on the bicycle at a location outside of the garage, or storage area, actuate the garage door opener while on or while riding the bicycle and entering the garage door or storage area without having to get off the bicycle or stop the bicycle. The garage door opener feature on the bicycle handlebar assembly or the rider control system increases the safety of riding the bicycle by allowing the rider to easily activate and open a garage door while mounted on or riding the bicycle and enter the garage door without having to stop or dismount the bicycle. This feature is particular useful in inclement weather, in the evening, or in situations where the rider is concerned about quick and safe entry into the garage or storage area.

While a preferred embodiment of the present invention has been described and illustrated, numerous departures therefrom can be contemplated by persons skilled in the art, for example, integral support structure could include an auxiliary accessory support platform configured to support accessories, controls and displays that is removably connected to the structure. Therefore, the present invention is not limited to the foregoing description but only by the scope and spirit of the appended claims.

What is claimed is:

1. An integral rider control device for a hand-steered vehicle, comprising:

a one-piece elongate integral support structure having a left end for receiving a left handgrip and a right end for receiving a right handgrip opposed to the left handgrip, the integral support structure formed by injection molding;

a plurality of non-tubular mounting surfaces formed in the integral support structure between the left end and the right end thereof, the mounting surfaces each configured to receive a respective piece of equipment selected from the group consisting of controls, displays and accessories; and a central region disposed between the left and right ends, the central region having an upper spar and a lower spar, the upper spar disposed vertically relative to the lower spar, the lower spar configured to be pivotally coupled to the vehicle along a steering axis of the vehicle, the upper and lower spars delimiting a forward-facing opening therebetween, the opening extending entirely through the support structure.

2. The integral rider control device of claim 1, wherein the left and right ends of the support structure comprise outwardly projecting left and right mandrels, each mandrel adapted to a receive a handgrip, at least one of the left and right ends including an outwardly projecting cylindrical sidewall.

3. The integral rider control device of claim 1, wherein the cylindrical sidewall, the mandrel and the integral support structure define a receiving cavity.

4. The integral rider control device of claim 1, wherein the support structure includes at least one cable passage extending through at least a portion of the integral support structure, the cable passage configured to provide a connection path between at least two pieces of equipment.

5. The integral rider control device of claim 1, wherein the integral support structure is made of a nylon with elastomeric modifiers.

6. The integral rider control device of claim 2, wherein an edge of each cylindrical sidewall includes a plurality of outwardly projecting detents, the edge and the detents configured to engage and allow for discrete rotational adjustment of a mandrel attachment about one of the left and right mandrels.

7. The integral rider control device of claim 6, wherein the detents of the left and right cylindrical sidewalls are configured to facilitate rotational positioning of the left and right mandrel attachments with respect to one another.

8. The integral rider control device of claim 1, wherein the integral support structure is a die cast structure.

9. An integral rider control device for a hand-steered vehicle, comprising:

a one-piece elongate integral support structure having a left end for receiving a left handgrip and a right end for receiving a right handgrip opposed to the left handgrip, the integral support structure formed by injection molding, the left and right ends of the support structure including outwardly projecting left and right mandrels, each mandrel adapted to receive a respective handgrip, at least one of the left and right ends including an outwardly projecting cylindrical sidewall, the cylindrical sidewall, the mandrel and the integral support structure defining a receiving cavity;

a plurality of non-tubular mounting surfaces formed in the integral support structure between the left end and the right end thereof, the mounting surfaces each configured to receive a respective piece of equipment selected from the group consisting of controls, displays and accessories; and a central region of the support structure configured to be pivotally coupled to the vehicle along a steering axis of the vehicle.

10. The integral rider control device of claim 9, wherein the support structure includes at least one cable passage extending through at least a portion of the integral support structure, the cable passage configured to provide a connection path between at least two pieces of equipment.

11. The integral rider control device of claim 9, wherein the integral support structure is made of a nylon with elastomeric modifiers.

12. The integral rider control device of claim 1, wherein the upper spar includes an elongate upward facing channel configured to receive one of additional equipment and to accommodate cabling.

* * * * *